United States Patent [19]
Jan et al.

[11] Patent Number: 5,367,304
[45] Date of Patent: Nov. 22, 1994

[54] COMMUNICATION SYSTEM EMPLOYING SPECTRUM REUSE ON A SPHERICAL SURFACE

[75] Inventors: Yih G. Jan; Kenneth M. Peterson, both of Phoenix, Ariz.

[73] Assignee: Motorola, Inc., Schaumburg, Ill.

[21] Appl. No.: 31,586

[22] Filed: Mar. 15, 1993

Related U.S. Application Data

[63] Continuation-in-part of Ser. No. 909,487, Jul. 6, 1992, Pat. No. 5,268,694.

[51] Int. Cl.$^5$ .................... H04B 7/185; H04B 7/15; H04M 11/00; H04Q 7/00
[52] U.S. Cl. ........................... 342/352; 379/63; 379/60; 455/13.1; 455/33.1; 455/34.1
[58] Field of Search ............... 342/352, 354; 379/59, 379/60, 63; 455/13.1, 33.1, 33.2, 33.3, 33.4, 34.1

[56] References Cited

U.S. PATENT DOCUMENTS

| | | | |
|---|---|---|---|
| 4,384,362 | 5/1983 | Leland | 455/33 |
| 4,736,453 | 4/1988 | Schloemer | 455/33 |
| 5,038,398 | 8/1991 | Wills | 455/13.1 |
| 5,038,399 | 8/1991 | Bruckert | 455/33 |
| 5,067,147 | 11/1991 | Lee | 379/60 |
| 5,073,971 | 12/1991 | Schaeffer | 455/33 |
| 5,134,709 | 7/1992 | Bi et al. | 455/33.1 |

OTHER PUBLICATIONS

An article entitled "Advanced Mobile Phone Service: The Cellular Concept" by V. H. Mac Donald, vol. 58, No. 1, Jan. 1979, pp. 15–40.

*Primary Examiner*—Gregory C. Issing
*Attorney, Agent, or Firm*—Frederick M. Fliegel

[57] ABSTRACT

Orbiting satellites (12) project footprints (30) on the earth. Each footprint (30) is divided into cells (28). Footprints (30) of nearby satellites (12) overlap one another, and the overlap increases as satellites (12) approach a pole from the equator. Positions of all cells (28) generated by all satellites (12) are simulated (36) at numerous points throughout an orbit. Channel sets are assigned to cells (28) within a reference footprint (30a). This assignment is propagated throughout all footprints (30) except for those footprints (30) residing adjacent one side of a seam (16) between orbits (14) where satellites (12) travel in opposing directions. The channel sets are assigned near the seam (16) in response to previously assigned channel sets. Each satellite (12) stores channel set assignments for its cells (28) at various points throughout its orbit. All satellites (12) switch their communication parameters simultaneously in response to the channel set assignments.

24 Claims, 16 Drawing Sheets

62

| ROW SEQUENCE TABLE ||
|---|---|
| LEFT CELL ASSIGNMENT | RIGHT CELL ASSIGNMENT |
| A | B |
| B | C |
| C | D |
| D | E |
| E | F |
| F | A |
| G | H |
| H | I |
| I | J |
| J | K |
| K | L |
| L | G |

*FIG. 7*

| CELL LOCATION TABLE | | | | | | |
|---|---|---|---|---|---|---|
| SUBJECT CELL | UP RIGHT | RIGHT | DOWN RIGHT | DOWN LEFT | LEFT | UP LEFT |
| 1 |  | RP-25 | S-02 | S-04 | S-03 | P-13 |
| 2 | RP-25 | RP-27 | S-09 | S-05 | S-04 | S-01 |
| ... | ... | ... | ... | ... | ... | ... |
| 7 | RP-20 | RP-19 | RF-31 | S-08 | S-10 | S-09 |
| 8 | S-07 | RF-31 | RF-33 | S-15 | S-11 | S-10 |
| 9 | RP-27 | RP-20 | S-07 | S-10 | S-05 | S-02 |
| ... | ... | ... | ... | ... | ... | ... |
| 13 | S-15 | RF-25 |  | F-01 | S-14 | S-16 |
| 14 | S-16 | S-13 | F-01 | F-03 | S-21 | S-17 |
| ... | ... | ... | ... | ... | ... | ... |
| 25 | S-26 | S-28 | S-27 | LF-02 | LF-01 | LP-13 |
| ... | ... | ... | ... | ... | ... | ... |
| 37 | S-06 | S-12 | S-18 | S-24 | S-30 | S-36 |

LEGEND

S — SAME FOOTPRINT.
P — FOOTPRINT PRECEDING THIS FOOTPRINT.
RP — FOOTPRINT TO THE RIGHT OF AND PRECEDING THIS FOOTPRINT.
RF — FOOTPRINT TO THE RIGHT OF AND FOLLOWING THIS FOOTPRINT.
F — FOOTPRINT FOLLOWING THIS FOOTPRINT.
LP — FOOTPRINT TO THE LEFT OF AND PRECEDING THIS FOOTPRINT.
LF — FOOTPRINT TO THE LEFT OF AND FOLLOWING THIS FOOTPRINT.

*FIG. 8*

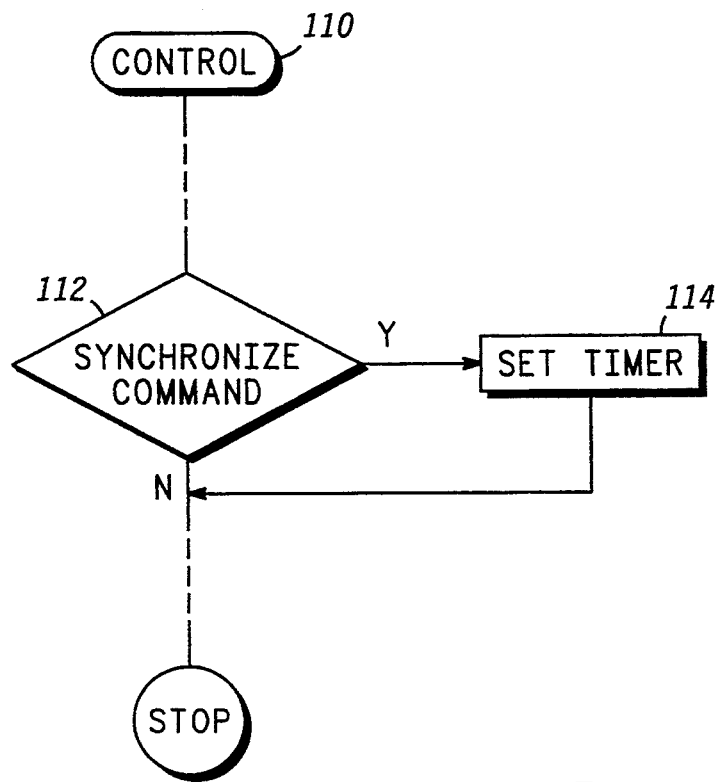
FIG. 13
FIG. 14
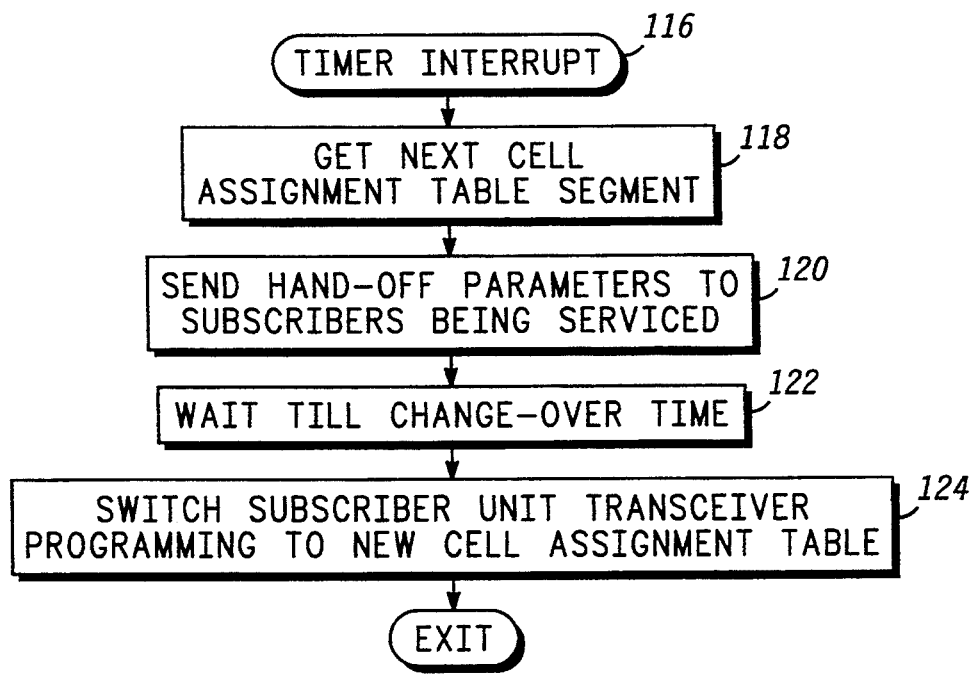

COMMUNICATION SYSTEM EMPLOYING SPECTRUM REUSE ON A SPHERICAL SURFACE

RELATED PATENTS

The present application is a continuation-in-part of "Communication System Employing Spectrum Reuse On a Spherical Surface" by Yih G. Jan and Kenneth M. Peterson, Ser. No. 07/909,487, filed Jul. 6, 1992, now U.S. Pat. No. 5,268,694 which is assigned to the assignee of the present application.

The present invention is related to "Satellite System Cell Management" by Pullman et al., U.S. Pat. No. 5,227,802, filed Dec. 23, 1991, allowed Nov. 10, 1992, which is assigned to the assignee of the present application and which is incorporated herein by reference.

TECHNICAL FIELD OF THE INVENTION

The present invention relates generally to communication systems. More specifically, the present invention relates to systems that divide an area within which communications are to take place into cells and which reuse spectrum among certain ones of the cells.

BACKGROUND OF THE INVENTION

Conventional cellular communication systems adopt a frequency reuse plan. Generally speaking, system antennas are erected at spaced apart locations. Each system antenna, along with transmitter power, receiver sensitivity, and geographical features, defines a cell. A cell is a geographical area on and near the surface of the earth within which communications may take place via a subscriber unit having predetermined operating characteristics and via the cell's antenna In a cellular system that efficiently uses the spectrum allocated to it, system antennas are located to minimize overlap between their respective cells and to reduce gaps between the cells.

The spectrum allocated to a conventional cellular system is divided into a few discrete portions, typically frequency bands. Each cell is allocated only one of the discrete portions of the spectrum, and each cell is preferably surrounded by cells that use other discrete portions of the spectrum. Communications within a cell use only the discrete portion of the spectrum allocated to the cell, and interference between communications taking place in other nearby cells is minimized because communications in such nearby cells use different portions of the spectrum. Co-channel cells are cells that reuse the same discrete portion of spectrum. To minimize interference, the frequency reuse plan spaces co-channel cells a minimum predetermined distance apart.

A cellular communication system which places antennas in moving orbits around the earth faces particular problems related to distributing discrete portions of the allocated spectrum to various cells. Due to the approximately spherical shape of the earth, cells which do not overlap in one region of the earth, such as the equator, may very well overlap in other regions, such as polar regions. When cells overlap, the co-channel cells that the overlapping cells are spacing apart reside closer together than permitted by the spectrum reuse plan. Interference between communications taking place in such closely spaced co-channel cells becomes more likely.

In addition, when antennas move relative to each other, the overlap between cells changes as a function of time. Any allocation of discrete portions of the spectrum to the cells remains valid only until relative movement of the antennas causes the overlap between the cells to change.

SUMMARY OF THE INVENTION

Accordingly, it is an advantage of the present invention that an improved communication system is provided.

Another advantage of the present invention is that a cellular communication system is provided which efficiently reuses spectrum throughout a spherical surface, such as the surface of the earth, to increase channel capacity given a fixed frequency spectrum.

Yet another advantage is that the present invention operates a cellular communication system's antennas when the antennas project overlapping cells.

Still another advantage is that the present invention provides a communication system that dynamically assigns discrete portions of spectrum to cells to compensate for varying overlap between the cells.

Still another advantage is that the present invention provides a communication system that reduces communications required to dynamically assign discrete portions of spectrum to cells.

The above and other advantages of the present invention are carried out in one form by a method of operating M antennas traveling around the earth substantially in N different orbits, where M and N are integer numbers. Each of the antennas projects a footprint toward the earth which is divided into a plurality of cells. Each of the antennas is controlled by a corresponding transceiver. The method calls for generating a multiplicity of momentary channel-to-cell assignment definitions. Each of these definitions associates channels with the cells in accordance with a spectrum assignment plan that spaces co-channel cells at least a predetermined distance apart. The multiplicity of definitions characterizes cell locations at a multiplicity of succeeding instants. An evaluation is performed on the multiplicity of momentary channel-to-cell assignment definitions to determine for which cells and corresponding instants channel assignments change. In addition, the evaluation determines new channel assignments resulting from these changes. The transceivers are controlled to operate in accordance with the results of the evaluation.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 7 shows a block diagram of a row sequence table used by the procedure depicted in FIG. 5 in accordance with the present invention;

FIG. 8 shows a block diagram of a cell location table used by the procedure depicted in FIG. 5 in accordance with the present invention;

FIG. 13 shows a flow chart of a Control procedure performed by a satellite to synchronize internal timing in accordance with the present invention;

FIG. 14 shows a flow chart of a Timer Interrupt procedure performed by a satellite to switch cell spectrum assignments in accordance with the present invention;

DETAILED DESCRIPTION OF THE PREFERRED EMBODIMENTS

Figure 1:
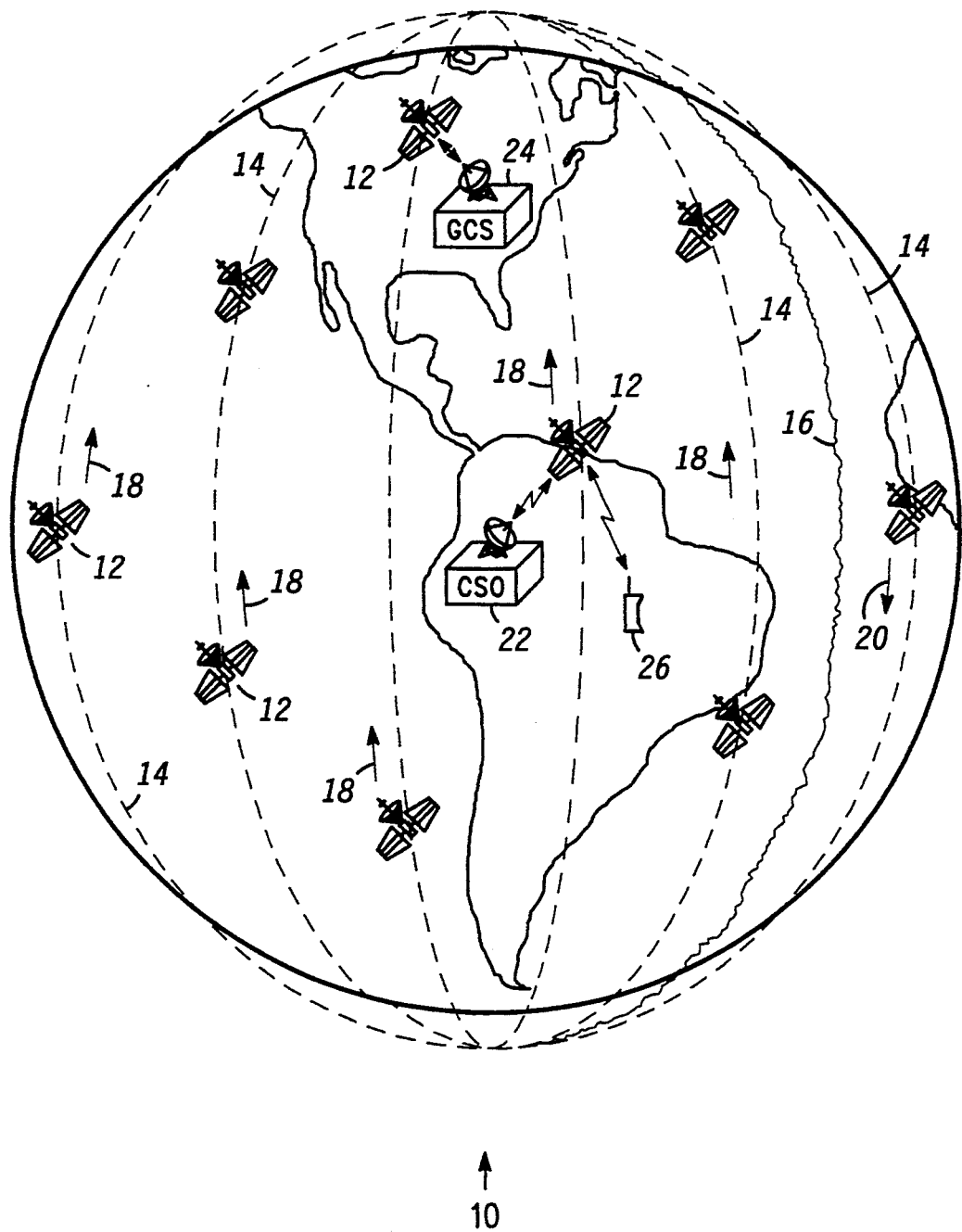
FIG. 1 shows a layout diagram of a satellite-based cellular communication system in accordance with the present invention.

FIG. 1 illustrates a satellite-based communication network 10. Network 10 is dispersed over the earth through use of several above-the-earth communication nodes, such as orbiting satellites 12. In the currently preferred embodiment, satellites 12 occupy polar, low-earth orbits 14. In particular, the preferred embodiment of network 10 uses six polar orbits, with each orbit holding eleven satellites 12 for a total of sixty-six satellites 12. For clarity, FIG. 1 illustrates only a few of these satellites 12.

Orbits 14 and satellites 12 are distributed around the earth. In the example depicted by the currently preferred embodiment, each orbit 14 encircles the earth at an altitude of around 765 km. Due to the relatively low orbits of satellites 12, substantially line-of-sight electromagnetic transmissions from any one satellite cover a relatively small area of the earth at any instant or point in time (as used herein, the terms "instant" and "point in time" are interchangeable). For example, when satellites 12 occupy orbits at around 765 km above the earth, such transmissions may cover "footprint" areas around 5000 km in diameter.

Due to the low-earth character of orbits 14, satellites 12 travel with respect to the earth at around 25,000 km/hr. This allows a satellite 12 to be within view of a point on the surface of the earth for a maximum period of around nine minutes. However, satellites 12 form a constellation in which satellites 12 remain relatively stationary with respect to one another, except for two modes of movement.

One mode of movement results from orbits 14 converging and crossing over or intersecting each other in polar regions. Due to this mode of movement, distances between satellites 12 residing in common orbits 14 remain substantially constant. However, distances between satellites 12 residing in adjacent orbits 14, also called cross-plane orbits 14, vary with the latitudes of the satellites 12. The greatest distance between these cross-plane satellites 12 exists at the equator. This distance decreases as cross-plane satellites 12 approach polar regions and increases as cross-plane satellites 12 approach the equator.

A second mode of movement occurs at constellation seam 16. Seam 16 divides the earth into two hemispheres with respect to the constellation of satellites 12. In one hemisphere, satellites 12 move from south to north, as indicated by direction arrows 18 in FIG. 1. In the other hemisphere, satellites 12 move from north to south, as indicated by direction arrow 20 in FIG. 1. Seam 16 resides on opposing sides of the earth between a south-north portion of an orbit 14 and a north-south portion of an orbit 14. Satellites 12 adjacent and on opposing sides of seam 16 travel in opposing directions and approach and pass each other at a rate of around 50,000 km/hr.

Satellites 12 communicate with devices on the ground through many central switching offices (CSOs) 22, of which FIG. 1 shows only one, a few ground control stations (GCSs) 24, of which FIG. 1 shows only one, and any number of radiocommunication subscriber units 26, of which one is shown in FIG. 1. Subscriber units 26 may be located anywhere on the surface of the earth or in the atmosphere above the earth. CSOs 22 are preferably distributed over the surface of the earth in accordance with geo-political boundaries. GCSs 24 preferably reside in extreme northern or southern latitudes, where the convergence of orbits 14 causes a greater number of satellites 12 to come within direct line-of-sight view of a single point on the surface of the earth when compared to more equatorial latitudes. Preferably, around four GCSs 24 are used so that all satellites 12 in the constellation may at some point in their orbits 14 come within direct view of their assigned GCS 24. However, the precise number and locations of GCSs 24 are not critical features in the present invention. Any satellite 12 may be in data communication with any GCS 24 at any time through the constellation of satellites 12.

Nothing prevents CSOs 22 and GCSs 24 from being located together on the ground. However, CSOs 22 serve a different function from that of GCSs 24. GCSs 24 preferably perform telemetry, tracking, and control (TT&C) functions for the constellation of satellites 12.

Preferably, CSOs 22 operate as communication nodes in network 10. Diverse terrestrial-based communications systems, such as the worldwide public switched telecommunications network (not shown), may access network 10 through CSOs 22. Due to the configuration of the constellation of satellites 12, at least one of satellites 12 is within view of each point on the surface of the earth at all times. Accordingly, network 10 may establish a communication circuit through the constellation of satellites 12 between any two subscriber units 26, between any subscriber unit 26 and a CSO 22, or between any two CSOs 22.

Figure 2:
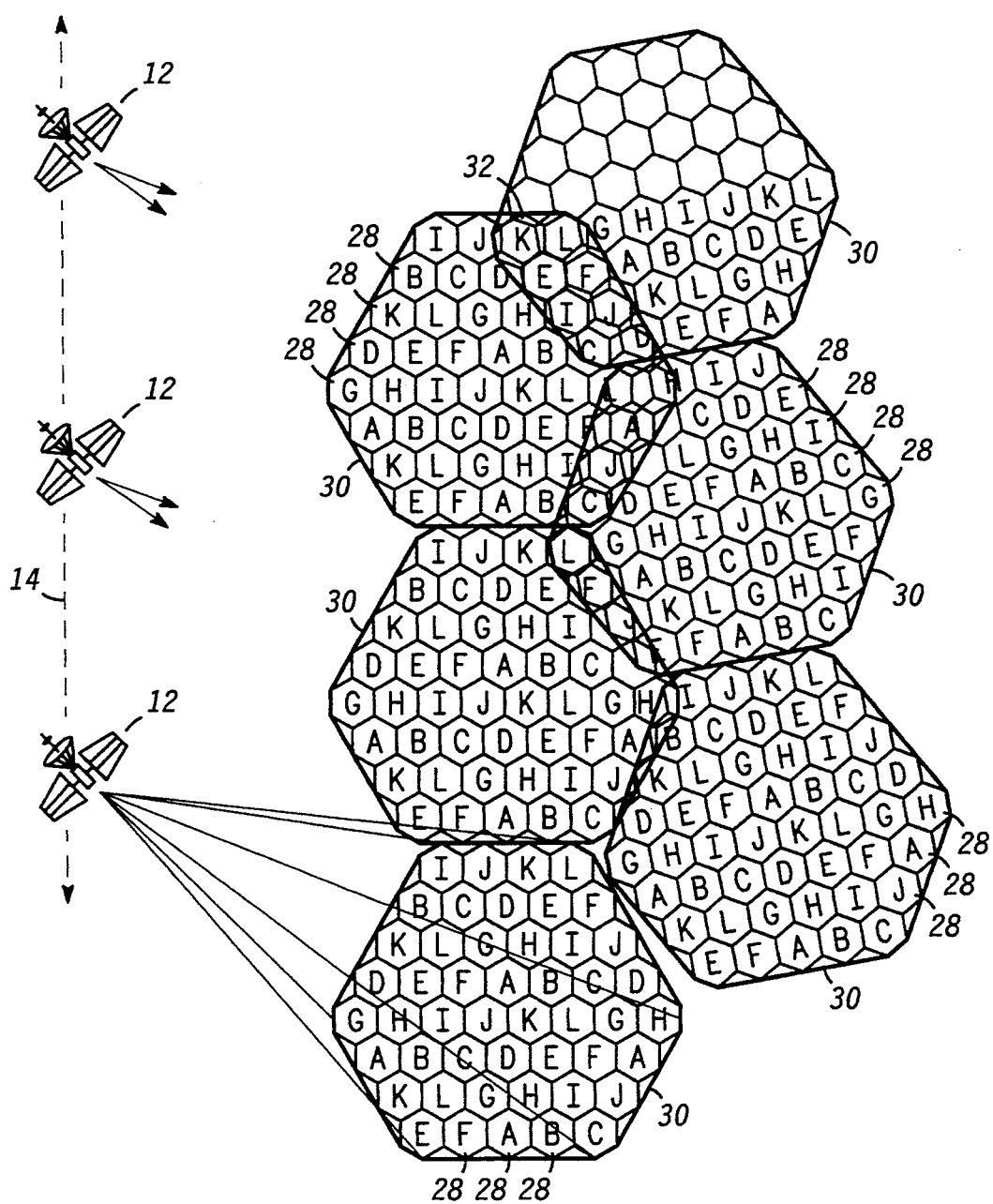
FIG. 2 shows a layout diagram of a portion of a cellular pattern formed on the surface of the earth by antennas placed in orbit around the earth in accordance with the present invention.

FIG. 2 shows a static layout diagram of an exemplary cellular antenna pattern achieved by six of satellites 12, wherein three of the six satellites are sequentially positioned in one orbit 14 and another three of the six satellites 12 are sequentially positioned in an adjacent orbit 14. For clarity, FIG. 2 depicts only the first three of satellites 12.

Each satellite 12 includes an array (not shown) of directional antennas, which may also be viewed as a single multi-directional, multi-beam antenna. Each array projects numerous discrete antenna patterns on the earth's surface at numerous diverse angles away from its satellite 12. FIG. 2 shows a schematic diagram of a resulting pattern of cells 28 that satellites 12 collectively form on the surface of the earth. With satellites 12 positioned at 765 km above the earth, cells 28 may have a diameter generally in the 526–753 km range. With satellites 12 traveling at speeds of up to 25,000 km/hr with respect to the earth, cells 28 also travel over the earth at close to this speed, and any given point on the surface of the earth resides within a single cell 28 for no more than around one minute.

The pattern of cells 28 which a single satellite 12 projects on the earth's surface is referred to as a footprint 30. FIG. 2 depicts footprints 30 as each having forty-eight cells 28. However, the precise number of cells 28 included in a footprint 30 is unimportant for the purposes of the present invention. FIG. 2 further illustrates an overlap 32 which results from the above-discussed convergence of orbits 14. The size of overlap 32 varies in response to the location of the overlapping footprints 30. As can be determined by reference to FIGS. 1–2, the greatest amount of overlap 32 occurs in the polar regions of the earth while little or no overlap occurs in the equatorial regions of the earth. Those skilled in the art will appreciate that FIG. 2 represents a static snapshot of footprints 30, and that the portion of overlap 32 which is associated with any two adjacent cross planar footprints 30 changes as satellites 12 move within orbits 14.

For convenience, FIG. 2 illustrates cells 28 and footprints 30 as being discrete, generally hexagonal shapes without overlap or gaps, other than those attributed to the convergence of orbits 14 near the polar regions of the earth and the divergence of orbits 14 near the equatorial regions of the earth. However, those skilled in the art will understand that in actual practice equal strength lines projected from the antennas of satellites 12 may be more circular or elliptic than hexagonal, that antenna side lobes may distort the pattern, and that some preferably minor overlap between adjacent cells may be expected.

While FIGS. 1–2 and the above-presented discussion describe a preferred orbital geometry for network 10, those skilled in the art will appreciate that the communication nodes which satellites 12 provide need not be positioned precisely as described herein. For example, such nodes may be located on the surface of the earth or in orbits other than those described herein. Likewise, the precise number of nodes may vary from network to network.

The constellation of satellites 12 communicates with all of subscriber units 26 (FIG. 1) using a limited amount of the electromagnetic spectrum. The precise parameters of this spectrum are unimportant to the present invention and may vary from network to network. The present invention divides this spectrum into discrete portions, hereinafter referred to as channel sets. The precise manner of dividing this spectrum is also unimportant to the present invention. For example, the spectrum may be divided into discrete frequency bands, discrete time slots, discrete coding techniques, or a combination of these. Desirably, each of these discrete channel sets is orthogonal to all other channel sets. In other words, simultaneous communication may take place at a common location over every channel set without significant interference.

Likewise, the precise number of channel sets into which the spectrum is divided is not important to the present invention. FIG. 2 illustrates an exemplary assignment of channel sets to cells 28 in accordance with the present invention and in accordance with a division of the spectrum into twelve discrete channel sets. FIG. 2 references the twelve discrete channel sets through the use of the characters "A", "B", "C", "D", "E", "F", "G", "H", "I", "J", "K", and "L". Those skilled in the art will appreciate that a different number of channel sets may be used and that, if a different number is used, the resulting assignment of channel sets to cells 28 will differ from the assignment pattern depicted in FIG. 2. Likewise, those skilled in the art will appreciate that each channel set may include one channel or any number of orthogonal channels therein, and that nothing requires different channel sets to include the same number of channels therein.

Figures 3, 4:
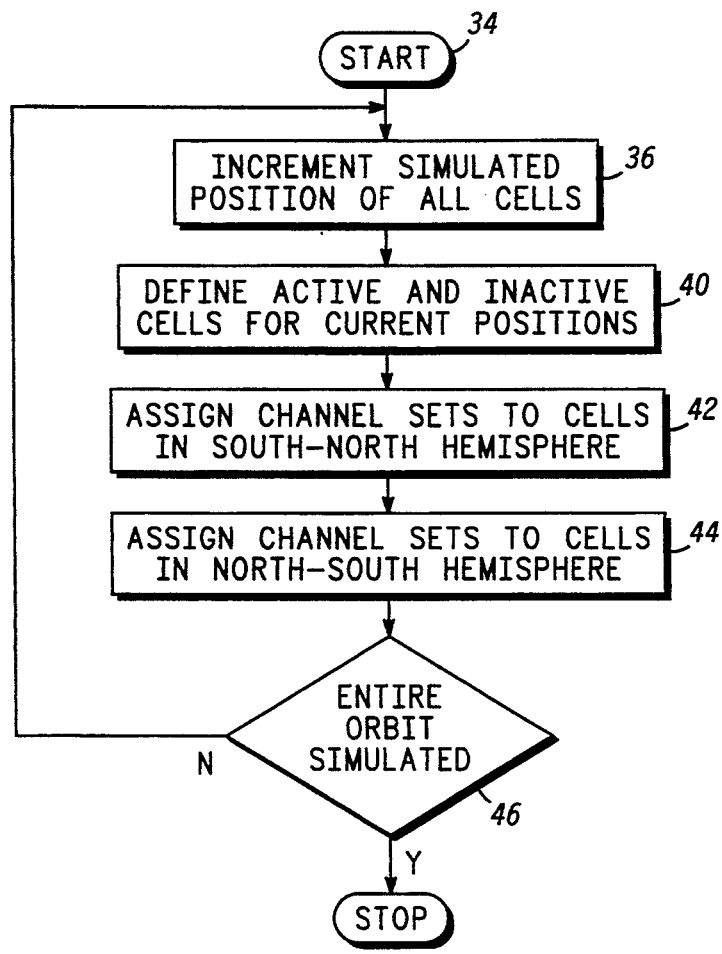
FIG. 3 shows a flow chart of a procedure used to assign discrete portions of spectrum to cells in accordance with the present invention.
FIG. 4 shows a block diagram of a position table used by the procedure of FIG. 3 in accordance with the present invention.

FIG. 3 shows a flow chart of a procedure 34 used in a first embodiment of the present invention to assign particular channel sets to particular cells 28. The procedure depicted in FIG. 3 may be practiced on a general purpose computer or on board one or more satellites 12, a block diagram of which is presented below in connection with FIG. 12. Those skilled in the art will appreciate that a general purpose computer may include one or more processors (not shown) which perform steps described in the flow chart of FIG. 3 in response to instructions stored in a memory (not shown) thereof.

Procedure 34 performs task 36 to simulate the position of all cells 28 relative to one another. For a first iteration of procedure 34, any position for the constellation of satellites 12 will suffice. For subsequent iterations, the simulated positions are desirably the positions which result from the movement of satellites 12 within orbits 14 away from a position associated with the previous iteration of procedure 34 for a predetermined increment of time. In a first embodiment of the present invention, this increment approximates a one cell diameter displacement from corresponding positions used in the previous iteration.

Task 36 may record the position of each cell 28 in a table similar to a position table 38, a block diagram of which is shown in FIG. 4. Each cell's position may be expressed by the cell's latitude and longitude, or in any other convenient form. The position data may be calculated by applying conventional trigonometric techniques to orbital and antenna geometries. In particular, the cells' positions may be determined from the orbits' positions, the satellites' speed, orbits' distance from the earth, and angles of displacement for various beams supported by the satellites' antennas away from the satellites' Nadir directions. The positions recorded in table 38 may desirably describe the location of the center of each cell 28 on the surface of the earth. If each footprint 30 includes forty-eight of cells 28 and the constellation includes sixty-six of satellites 12, then task 36 describes 3168 positions. If each footprint 30 includes thirty-seven of cells 28 and the constellation includes sixty-six of satellites 12, then task 36 describes 2442 positions.

With reference back to FIG. 3, after task 36 task 40 defines each cell generated from the operation of the constellation of satellites 12 as being either active or inactive. Active cells may be viewed as being turned "on" while inactive cells may be viewed as being turned "off". Satellites 12 will refrain from broadcasting transmissions within inactive cells 28, and any signals received at satellites 12 from inactive cells 28 will be ignored. Satellites 12 transmit/receive signals to/from active cells using channel sets assigned to the respective active cells.

Generally speaking, task 40 may be performed by analyzing the positions recorded in table 38 (FIG. 4) during task 36. The distances between the center of each cell and the centers of all other cells may be compared with a predetermined distance. When the distance between two of cells 28 is less than this predetermined distance, an overlap is declared between the two cells. In the preferred embodiment, an overlap is declared when at least 70% of two cells 28 occupy the same area. Task 40 then determines which of the two overlapping cells 28 to define as being inactive to cure the overlap. Generally, task 40 defines a cell 28 located toward the outer region of its footprint 30 as being inactive rather than an overlapping cell 28 located closer to the center region of its footprint 30. Any cell which is not declared as being inactive is defined to be active. Additional details related to the operation of task 40 may be obtained from the above-referenced related patent.

After task 40, task 42 assigns, in the first embodiment of the present invention, channel sets to all active cells in the south-north hemisphere of the constellation of satellites 12. As discussed above in connection with FIG. 1, this hemisphere is separated from a north-south hemisphere by seam 16. These assignments are preferably recorded in position table 38 (FIG. 4) in association with each cell's identity. Details related to the assignment of channel sets to cells are discussed below in connection with FIGS. 5–11. After completion of task 42, task 44 repeats this assignment procedure, except that task 44 assigns channel sets for the north-south hemisphere of the constellation of satellites 12.

After task 44, query task 46 determines whether cell positions for an entire orbit have been simulated. If the entire orbit has not been simulated yet, program control loops back to task 36 to increment the cells' positions and repeat the assignment process. If task 46 determines that the entire orbit has been simulated, then procedure 34 may stop because channel set to cell assignments for additional positions will generally duplicate previous assignments recorded in table 38 (FIG. 4).

Satellites 12 may then use this assignment data in controlling the operation of their transceivers and antennas, as discussed below in connection with FIGS. 12–14. Preferably, procedure 34 is performed "off-line" and only those channel set to cell assignments for an entire orbit which result from procedure 34 and relate to a given satellite 12 are recorded in the memory of that satellite 12. However, in an alternate embodiment, satellites 12 may perform procedure 34, or portions of it, themselves and utilize the resulting channel set to cell assignments to control their transceiver's and antenna's operations. In this alternative embodiment, the loop depicted in FIG. 3 may repeat indefinitely, with each iteration of the loop simulating the positions of the satellites' cells just prior to the time when the cells actually reach the simulated positions. The resulting assignments will then be available when needed, and additional assignments will not be needed until the satellite movement causes cells to move to their incremented positions.

Figure 5:
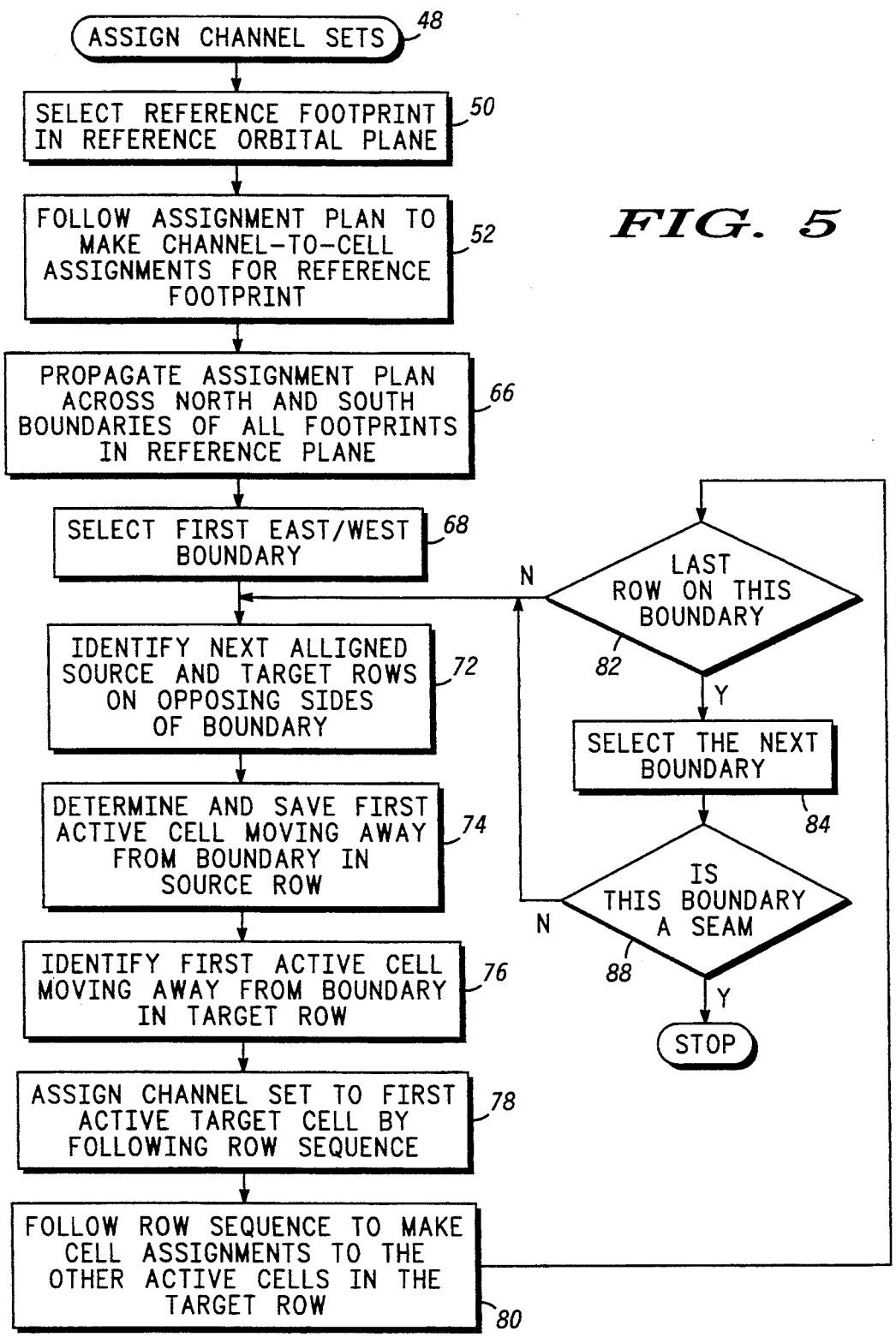
FIG. 5 shows a flow chart of an Assign Channel Sets procedure used by the procedure depicted in FIG. 3 in accordance with the present invention.

FIG. 5 shows a flow chart of Assign Channel Sets procedure 48 used by tasks 42 and 44 of procedure 34 (FIG. 3) in accordance with the first embodiment of the present invention to assign channel sets to the cells generated by one hemisphere of the constellation of satellites 12. Task 50 in procedure 48 selects a reference footprint 30a in a reference orbital plane 14a, as shown in FIG. 6.

Figure 6:
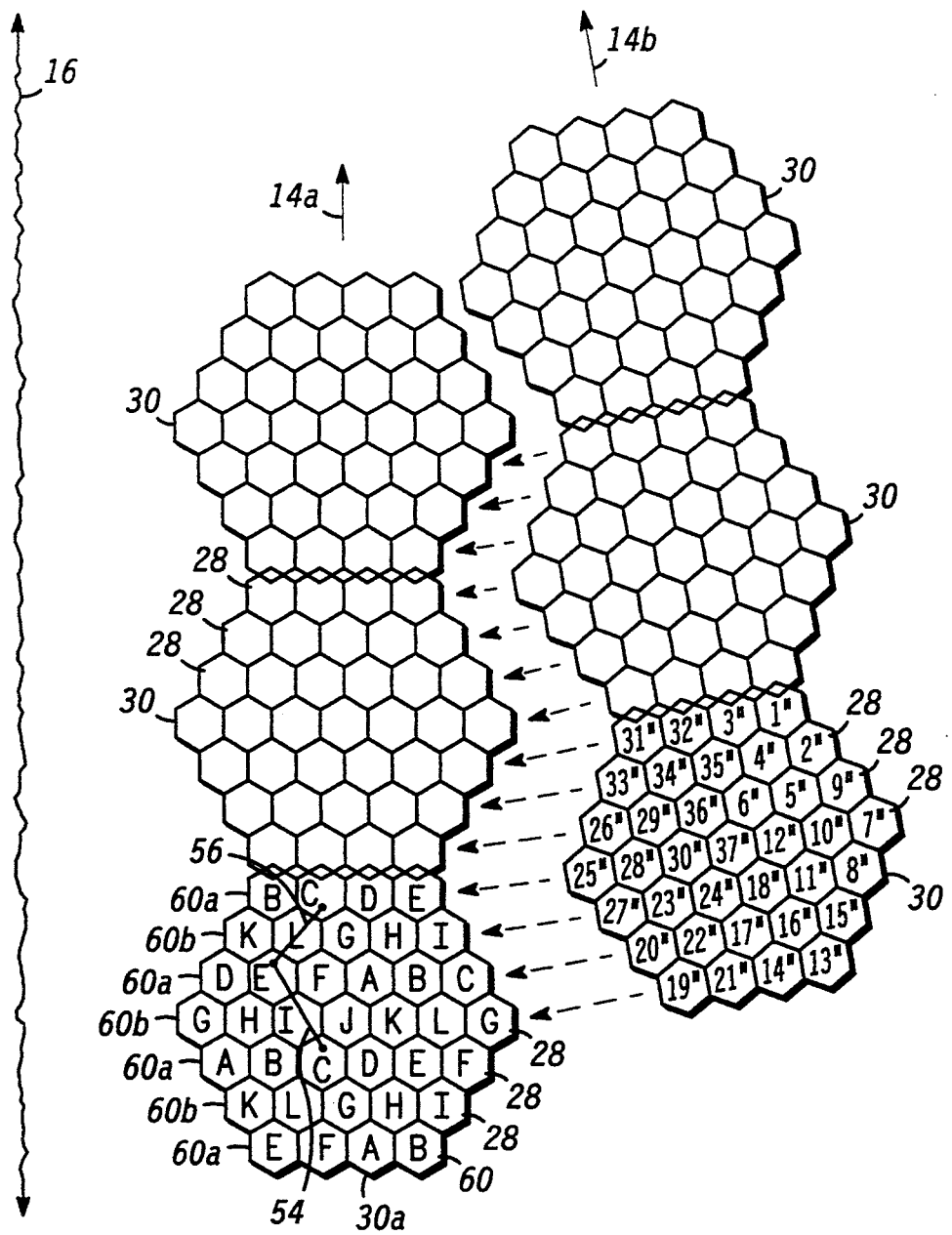
FIG. 6 shows an exploded layout diagram of a portion of a cellular pattern formed on the surface of the earth and exemplary assignments made at a first stage in the procedure depicted in FIG. 5 in accordance with the present invention.

FIG. 6 (similar to FIG. 2) shows an exploded layout diagram for six of footprints 30. FIG. 6 illustrates a system using thirty-seven cells 28 per footprint 30 rather than the forty-eight cells 28 per footprint 30 depicted in FIG. 2. In addition, FIG. 6 is an exploded diagram because the footprints 30 produced by satellites 12 in one orbit 14a are spaced apart from the footprints 30 produced by satellites 12 in an adjacent orbit 14b. FIG. 6 illustrates actually overlapping footprints 30 as being separated to clarify the below-discussed procedure for assigning channel sets to cells.

While any footprint 30 in the selected hemisphere may serve as reference footprint 30a, task 50 (FIG. 5) in the preferred embodiment utilizes an equatorially located footprint 30 in an orbital plane 14 adjacent seam 16 (FIG. 1). After task 50, task 52 follows a channel set assignment plan to assign channel sets to the cells 28 located within reference footprint 30a. FIG. 6 shows an exemplary twelve cell reuse pattern that task 52 assigns to cells 28 of reference footprint 30a. In other words, twelve discrete channel sets are distributed among cells 28 of footprint 30a so that co-channel cells are spaced a minimum predetermined distance apart from one another.

In accordance with the first embodiment of the present invention, footprints 30 located in the two hemispheres may use different channel sets to prevent interference at seam 16.

Task 52 may assign channel sets using the plan or formula:

$N = i^2 + j^2 + i \cdot j$, where:

N = the number of discrete channel sets available in the spectrum being assigned;
i = a shift parameter for a first direction;
j = a shift parameter for a second direction; and $i \leq j$.

Using this formula, co-channel cells are determined by moving "i" cells in a first direction away from a source cell, as shown by line segment 54 in FIG. 6, then rotating clockwise (or counter-clockwise) 60° and moving "j" cells, as shown by line segment 56 in FIG. 6. The results from applying this assignment plan for all cells 28 within footprint 30a are then recorded in a memory structure, such as position table 38 (FIG. 4).

In an alternate embodiment, task 52 (FIG. 5) may use a table (not shown) which associates channel set assignments with cell numbers. In connection with another one of footprints 30, FIG. 6 shows an exemplary assignment of cell numbers to cells 28. These cell numbers are indicated by labels 1"–37" in FIG. 6. Each footprint 30 preferably uses the same cell numbering scheme. Cell numbers are used to identify cells 28 in position table 38 (FIG. 4) and other memory structures used by procedures 34 (FIG. 3) and 48. Those skilled in the art will appreciate that the particular assignment of cell numbers to cells 28 is arbitrary and that, so long as each cell 28 within a footprint 30 has its own unique identifier, other cell numbering schemes may be used as well. In this alternate embodiment, task 52 may assign channel sets to the cells 28 of reference footprint 30a by copying channel set assignments to an appropriate section of a memory structure, such as position table 38.

In yet another embodiment of the present invention, task 52 may utilize one table (not shown) to assign a channel set to one predetermined cell in each row 60 of reference footprint 30a. Then, this embodiment may use a row sequence table 62, such as that illustrated in FIG. 7, to propagate the assignments left and/or right, with respect to the direction of movement of satellite 12, within each row 60 until the boundaries of footprint 30a have been reached. The locations of each cell 28 in a footprint 30 may be determined from any subject cell in the footprint 30 by reference to a cell location table 64, such as that shown in FIG. 8. Using table 64, a table look-up operation may be performed to determine which cell is located immediately in left, right, up left, up right, down left, or down right directions from any other cell within a footprint 30.

Those skilled in the art will appreciate that tables 62 and 64 shown in FIGS. 7–8 illustrate only one exemplary situation. Row sequence table 62 is applicable to a twelve cell reuse assignment plan and cell location table 64 is applicable to a thirty seven cell footprint 30 having cell number assignments as depicted in FIG. 6. Other similar tables or memory structures may be fashioned to achieve an acceptable assignment plan that spaces co-channel cells a predetermined distance apart from one another for a different number of discrete channel sets in a spectrum, for a different number of cells per footprint, and/or a different channel numbering scheme.

Regardless of the particular assignment plan process used, task 52 assigns channel sets to cells 28 within footprint 30a in alternating rows 60. For the example shown in FIG. 6, channel sets A-F are confined to rows 60a and channel sets G-L are confined to rows 60b. Rows 60a and 60b are interleaved with one another. In addition, a constant pattern of channel set assignments results from progressing through cells 28 up-right (A-H-E-L-C-J, B-I-F-G-D-K) or upleft (A-G-C-I-E-K, B-H-D-J-F-L). Of course, the opposite sequences result from progressing through cells 28 down-left or down-right, respectively.

Figure 9:
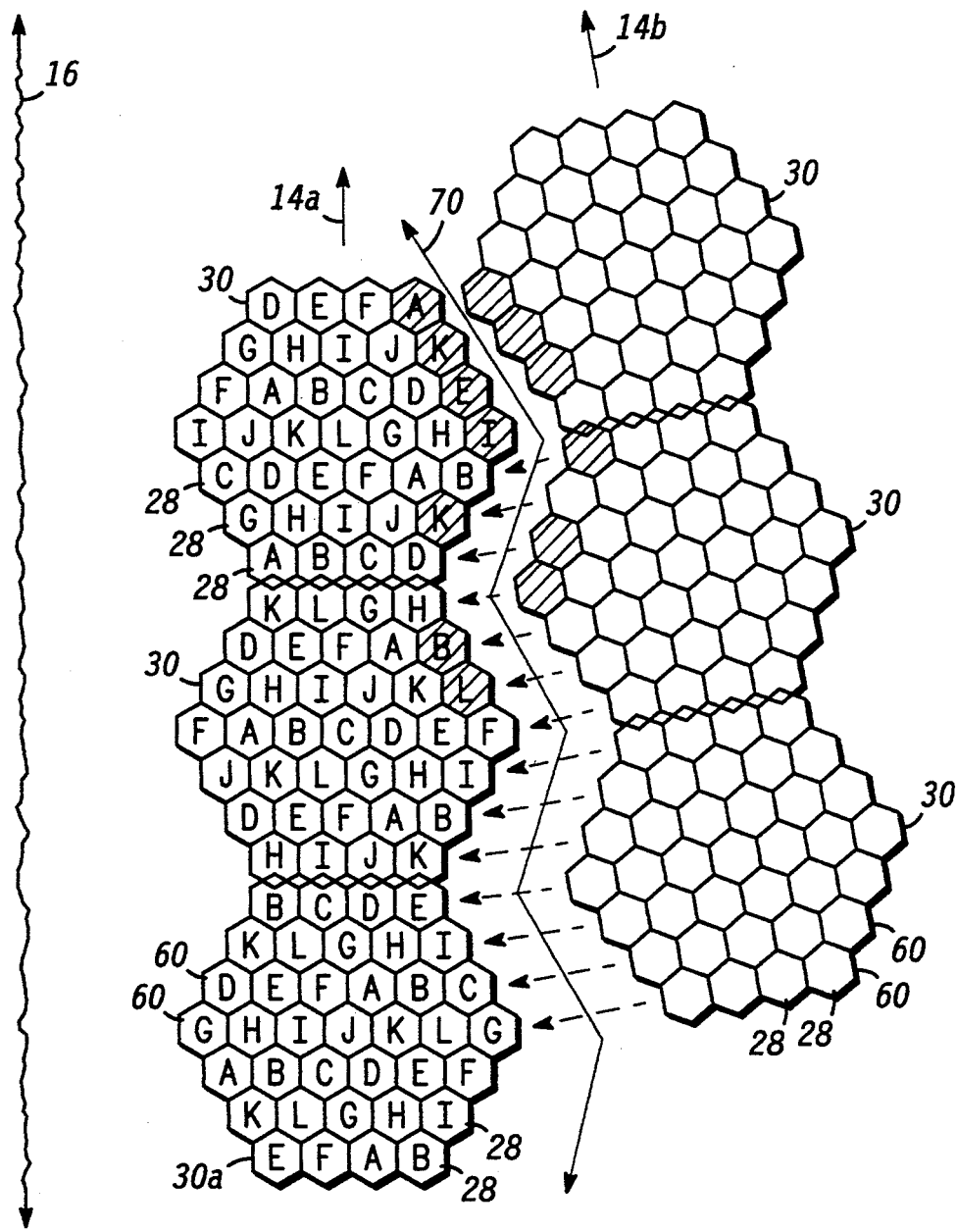
FIG. 9 shows an exploded layout diagram of a portion of a cellular pattern formed on the surface of the earth and exemplary assignments made at a second stage in the procedure depicted in FIG. 5 in accordance with the present invention.

With reference back to FIG. 5, after task 52, task 66 propagates the assignment plan across northern and southern boundaries for all footprints 30 within the reference plane 14a (FIG. 9). Propagation of the assignment pattern across a northern boundary may be achieved by following the above-discussed up-right and up-left sequences or the above-discussed assignment formula. Propagation of the assignment pattern across a southern boundary may be achieved by following the above-discussed down-right and down-left sequences or the above-discussed assignment formula. Cell location table 64 (FIG. 8) may be consulted to determine which cells 28 of an unassigned footprint 30 located immediately to the north or south of an assigned footprint 30 are the initial targets in following these sequences.

Those skilled in the art will appreciate that cell location table 64 (FIG. 8) records an additional 30° of rotation across a footprint's northern and southern boundaries in addition to the 60° discussed above in connection with the assignment formula. This additional 30° is accounted for in the identity of cells located across northern or southern boundaries from a source cell. This additional 30° is needed because thirty-seven cell footprints, and other footprints which have a single centrally located cell 28, do not smoothly mate together at these boundaries, as illustrated in FIG. 6. In contrast, forty-eight cell footprints, and other footprints not having a single centrally located cell 28, smoothly mate together at these boundaries, as illustrated in FIG. 2. When a network employs footprints not having a single centrally located cell 28, the additional 30° of rotation is not needed.

FIG. 9 shows an assignment of channel sets to cells in footprints 30 located in the reference plane 14a after the performance of task 66 (FIG. 5). Of course, task 66 also assigns channel sets to cells 28 of footprints 30 located to the south of reference footprint 30a even though such southern footprints 30 are not depicted in FIG. 9. FIG. 9 also indicates by cross-hatching that certain ones of cells 28 have been defined as being inactive through the operation of task 40 (FIG. 3).

After task 66 (FIG. 5), task 68 selects a first east/west boundary 70 between orbital planes 14a, 14b. Preferably, the first boundary 70 is located on the opposing side of reference plane 14a from seam 16. Some of the inactive cells 28 are located near boundary 70, and more inactive cells are located in polar regions than in equatorial regions. FIG. 9 illustrates an assignment of channel sets to inactive cells in reference plane 14a. However, it is unimportant whether channel sets are actually assigned to inactive cells.

After task 68, task 72 (FIG. 5) identifies aligned source and target rows 60 on opposing sides of boundary 70. Referring to FIG. 9, source rows 60 are confined to a single footprint 30 that is located on a previously assigned side of boundary 70. Target rows 60 are confined to a single footprint 30 located on an unassigned side of boundary 70. Aligned source and target rows 60 are indicated in FIG. 9 by dotted lines. Cell location table 64 (FIG. 8) may be used to identify a specific cell 28 in a specific footprint 30 which is aligned with a target row. For the example depicted in FIGS. 8–9, cells 28 located to the right of the right-most cells 28 in a previously assigned footprint 30 reside in the target row. For the first iteration of task 72, any of source and target rows 60 that are aligned may be selected.

With reference to FIGS. 5 and 9, after task 72 task 74 determines the first active cell 28 encountered while moving away from boundary 70 in the source row 60 selected above in task 72. After identifying this first active cell 28, task 74 records the identity of the channel set assigned to it. After task 74, task 76 identifies the first active cell encountered while moving away from boundary 70 in the target row 60 selected above in task 72.

After tasks 74 and 76, task 78 assigns a channel set to this first active cell in the target row 60. The assignment is made by following the row sequence from the channel set recorded above in task 74. The row sequence may be determined, for example, by referring to row sequence table 62 (FIG. 7). Starting from this first active cell in the target row and proceeding away from boundary 70, task 80 follows the row sequence to assign channel sets to the remaining cells in the target row of the target footprint 30. Row sequence table 62 (FIG. 7) and cell location table 64 (FIG. 8) may be used in making these channel set assignments.

After tasks 72–80, query task 82 determines whether the previously assigned target row 60 is the last row to be assigned on boundary 70. So long as additional rows 60 remain to be assigned, program control repeats tasks 72–82 to assign channel sets to other rows along boundary 70.

Figure 10:
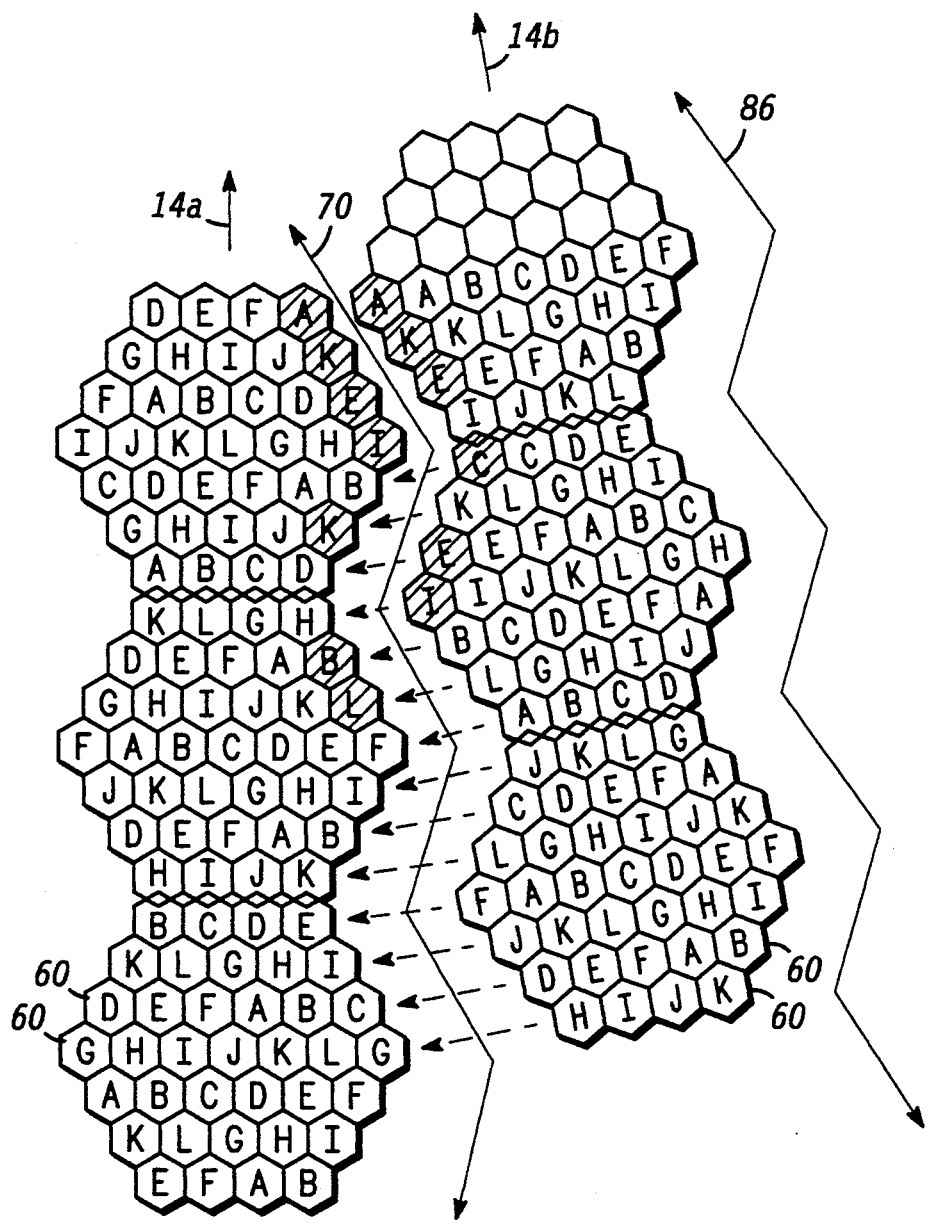
FIG. 10 shows an exploded layout diagram of a portion of a cellular pattern formed on the surface of the earth and exemplary assignments made at a third stage in the procedure depicted in FIG. 5; in accordance with the present invention

When all rows on boundary 70 have been assigned; the resulting assignment resembles the situation depicted in FIG. 10. As discussed above, it is unimportant whether channel sets are assigned to inactive cells. When all rows on boundary 70 have been assigned, task 84 (FIG. 5) selects another boundary 86 which is preferably on the opposing side of the target footprints 30 from boundary 70. Next, query task 88 (FIG. 5) in the first embodiment of the present invention determines whether the selected boundary 86 is located on a seam 16 (FIG. 1). So long as the new boundary 86 is not located on a seam 16, tasks 72–84 are repeated to propagate the channel set assignments across the selected hemisphere. When channel sets have been assigned to cells 28 located on seam 16, procedure 48 stops.

Figure 11:
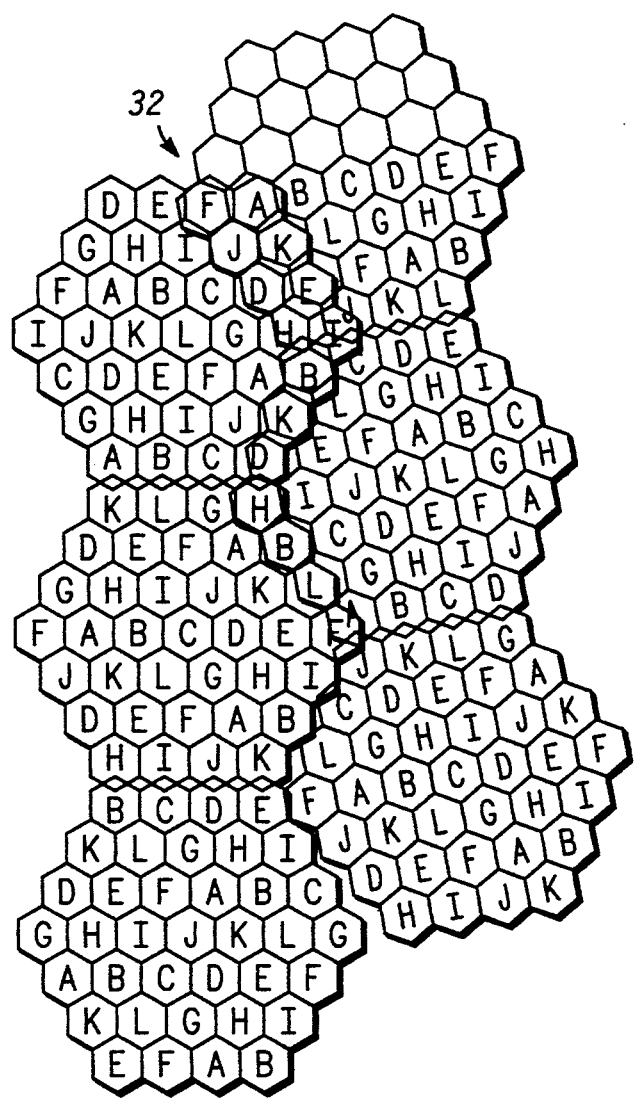
FIG. 11 shows a layout diagram of a portion of a cellular pattern formed on the surface of the earth and exemplary assignments made upon completion of the procedure depicted in FIG. 5 in accordance with the present invention.

FIG. 11 illustrates an exemplary assignment pattern that results from the performance of tasks 72–84 and accounts for overlap 32. As a result of performing tasks 72–84, channel sets are assigned to cells in target rows of a footprint 30 by following the row sequence and keying off of the channel set assigned to the last active cell in the source row. Consequently, the assignment of channel sets in the target row is responsive to the assignments made in the active cells of a corresponding source row and to any inactive cells residing in either or both of the source and target rows. By following the row sequence but skipping the inactive cells, a minimum separation distance between co-channel cells is maintained across boundary 70.

Those skilled in the art will appreciate that the occasional skipping of cells in the channel assignment plan and the above-discussed 30° rotation will cause the up-right, up-left, down-right, and down-left sequences discussed above to be altered in various locations after crossing a boundary 70. This alteration will have only a small impact on the minimum separation between co-channel cells because it occurs in a north-south direction between rows 60 and not in an east-west direction within any single row 60. As discussed above, channel set assignments follow sequences which repeat within interleaved rows. Consequently, all channel sets assigned to rows located immediately to the north and south of a subject row are orthogonal to each channel set in the subject row. In accordance with the procedure discussed herein, co-channel cells maintain a minimum separation distance which is at least as great as the diameter of a single cell 28.

Figure 12:
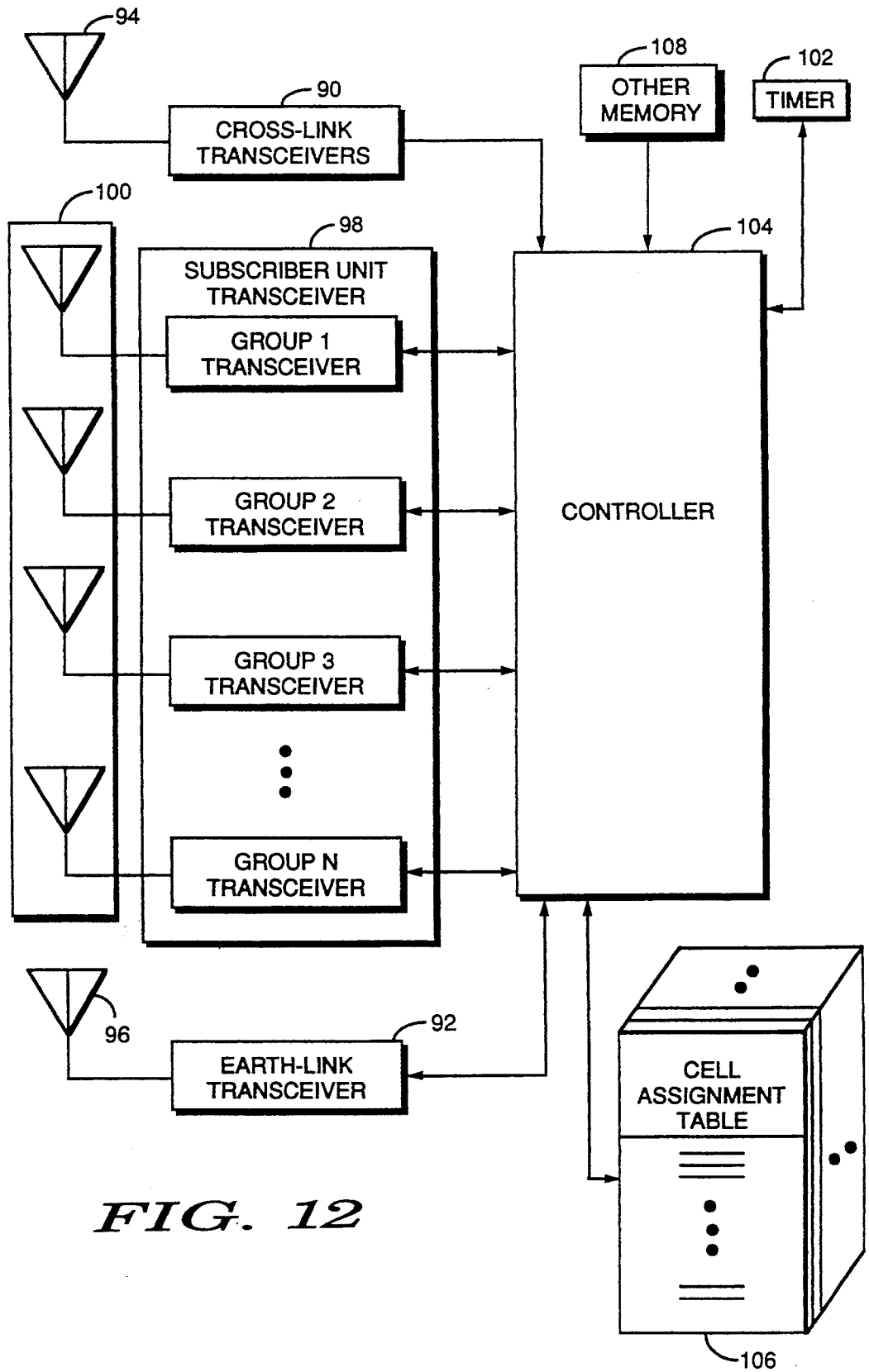
FIG. 12 shows a block diagram of a satellite constructed in accordance with the teaching of the present invention.

FIG. 12 shows a block diagram of a satellite 12 used by network 10 (FIG. 1). In the currently preferred embodiments, all satellites 12 within network 10 have substantially the same structure for the purposes of the present invention. Thus, FIG. 12 may depict each and every one of satellites 12. Satellite 12 includes any number of transceivers. For example, cross link transceivers 90 serve communication links between a satellite 12 and other nearby satellites 12 (FIG. 1). In addition, satellite 12 includes one or more earth-link transceivers 92 which support communication links to CSOs 22 and GCSs 24 (FIG. 1). Transceivers 90 and 92 communicate via their respective antennas 94 and 96. Satellite 12 additionally includes a subscriber unit transceiver 98. Transceiver 98 communicates with subscriber units 26 through a multi-beam, multi-directional antenna 100. Transceiver 98 and antenna 100 may be divided into any number of independent channels, segments, or groups so that discrete cells 28 are formed and discrete channel sets are supported.

Each of transceivers 90, 92, and 98, along with various memory components and a timer 102 couple to a controller 104. Controller 104 may be implemented using a single processor or multiple processors operated in a parallel architecture. Generally speaking, controller 104 coordinates and controls transceivers 90, 92, and 98 along with their associated antennas so that satellite 12 receives data communications from receivers of the various communication links and appropriately distributes the received communications among transmitters for the various communication links. Timer 102 is utilized to synchronize controller 104 and satellite 12 with timing constraints imposed by network 10 (FIG. 1).

The memory components include a cell assignment table 106. Table 106 associates channel set assignments with cell identities in a one to one correspondence. Table 106 may also record which, if any, of the cells 28 in the footprint 30 generated by satellite 12 are to be inactive. Thus, by supplying a cell number to table 106, a channel set assigned to the identified cell or data defining whether the cell is active or inactive may be obtained. The channel set to cell assignments may be determined as described above in connection with FIGS. 3–11. Moreover, as discussed above each cell may have numerous channel sets assigned thereto, with particular ones of the numerous channel sets being responsive to corresponding positions of satellite 12 within its orbit 14. Thus, cell assignment table 106 may also record timing data which indicate when particular channel set assignments are to become active.

The memory components also include other memory 108. Memory 108 includes data which serve as instructions to controller 104 and which, when executed by processor(s) within controller 104, cause satellite 12 to carry out procedures that are discussed below. Memory 108 also includes other variables, tables, and databases that are manipulated due to the operation of satellite 12.

FIG. 13 shows a flow chart of a Control procedure 110 performed by a single satellite 12 within network 10. Procedure 110 causes satellite 12 to become synchronized to an external timing signal. Those skilled in the art will appreciate that, while procedure 110 is described for a single satellite 12, each of satellites 12 desirably performs substantially the same procedure. Generally speaking, Control procedure 110 is invoked when a TT&C command is received from a GCS 24 (FIG. 1). TT&C commands may involve numerous diverse commands, such as orbit control commands, diagnostics commands, and programming commands, to name a few.

Such TT&C commands may additionally include a synchronizing command. When the synchronizing command is detected, as indicated at query task 112, program control retrieves data from the synchronizing command and programs timer 102 (FIG. 12) in response to synchronization data carried by the synchronizing command, as shown in task 114. In the preferred embodiment, satellites 12 come within view of a GCS 24 every few orbits. Thus, they may synchronize their internal time to the system time for network 10 every few hours. With every satellite 12 performing substantially the same procedure, the internal timers 102 of all satellites 12 recognize a given instant substantially simultaneously. In the preferred embodiment, timers 102 for all of satellites 12 remain synchronized to within 50 microseconds of one another. After synchronization, procedure 110 may engage in other TT&C activities not related to the present invention. Due to the operation of procedure 110, all satellites 12 within network 10 recognize a given instant substantially simultaneously.

FIG. 14 shows a flow chart of a Timer Interrupt procedure 116 which is performed by a single satellite 12 within network 10. Procedure 116 causes satellite 12 to change the assignments of channel sets to cells with which it is operating into a new set of assignments. While procedure 116 is described for a single satellite 12, each of satellites 12 desirably performs substantially the same procedure. Generally speaking, Timer Interrupt procedure 116 is invoked in response to a signal supplied from timer 102 (FIG. 12). Upon entry into procedure 116, task 118 obtains the next segment of cell assignment table 106. This next segment includes either the identity of channel sets to be assigned to each of the satellite's cells upon the occurrence of an upcoming event or the identity of those cells and channel sets that will change as a result of the upcoming event.

After task 118, task 120 causes satellite 12 to communicate with those subscriber units 26 (FIG. 1) currently supported by satellite 12. In particular, satellite 12 informs such units 26 of an upcoming change in the identity of the channels over which communications are taking place. Such communications concerning upcoming changes in channel identities are called "hand-off" communications. After task 120, task 122 waits until a particular instant occurs. This particular instant represents the upcoming event discussed above in connection with task 118. It is a predetermined instant at which up to all satellites 12 within network 10 will change their channel set to cell assignments to compensate for overlap in and movement of their footprints 30 as they orbit the earth. The occurrence of this instant may be determined from timer 102. As discussed above, procedure 110 (FIG. 13) synchronizes all satellites 12 so that each satellite 12 recognizes this instant simultaneously.

After task 122, task 124 programs subscriber unit transceiver 98 (FIG. 12) so that its operational programming switches in accordance with the active/inactive status and channel set assignment data obtained above in connection with task 118. After task 124, program control leaves procedure 116. Procedure 116 will be executed again when satellite 12 reaches the point in its orbit that corresponds to the next segment of assignment table 106 (FIG. 12). Until procedure 116 is executed again, satellite 12 will communicate through antenna 100 in accordance with these updated channel set to cell assignments.

FIGS. 15–18 describe a second embodiment of the present invention. This second embodiment differs from the first embodiment discussed above in the assignment of channel sets to those footprints 30 (FIG. 2) that are located near seam 16 (FIG. 1). In the first embodiment, discussed above, footprints 30 located in the two hemispheres may use different channel sets to prevent interference at seam 16. In this second embodiment, the same channel sets may be assigned in the two hemispheres.

Another difference between the above-discussed first embodiment and this second embodiment is that many more channel assignments are simulated for each entire orbit in this second embodiment. In the first embodiment, task 36 (FIG. 3) incremented a simulated position for all cells a distance approximately equivalent to a cell diameter. In this second embodiment, positions for all cells are incremented a much smaller distance. For example, the positions for satellites 12 may be simulated at each 0.1° of latitude around the earth. This corresponds to simulating about 50–60 positions for each cell diameter using the currently preferred cell size.

Figure 15:
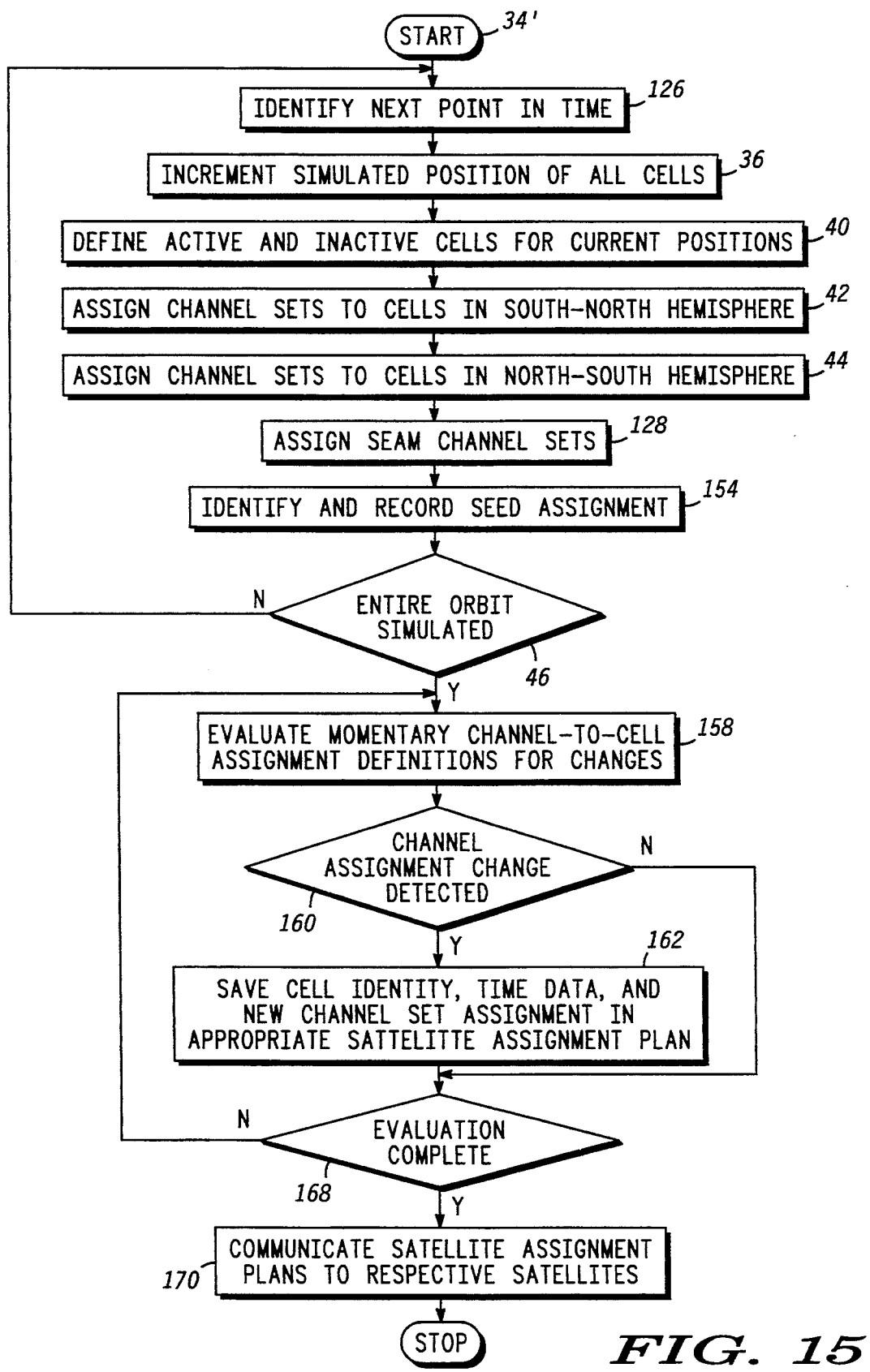
FIG. 15 shows a flow chart of an alternate procedure used to assign discrete portions of spectrum to cells in accordance with the present invention.

FIG. 15 shows a flow chart of a procedure 34' used in the second embodiment of the present invention to assign particular channel sets to particular cells 28. Procedure 34' performs similar functions to procedure 34, discussed above in connection with FIG. 3. Procedure 34' is preferably practiced on a general purpose computer at a control station, such as a GCS 24 (FIG. 1).

Procedure 34' performs task 126 to identify a next instant to be simulated for the assignment of channel sets to cells. When procedure 34' simulates the positions at each 0.1° of latitude around the earth for satellites 12 which may move at around 25,000 km/hr, the next instant is approximately 1-$\frac{2}{3}$ seconds following a prior instant. Through repeating task 126 many times in a loop formed in procedure 34', task 126 identifies a series of succeeding, future-occurring instants.

After task 126, procedure 34' performs tasks 36, 40, 42, and 44 in substantially the same manner as in procedure 34, discussed above (FIG. 3). Generally speaking, task 36 simulates positions for all cells 28 at the instant identified in task 126. Task 40 characterizes cells 28 at the positions simulated in task 36 as being active or inactive to account for overlap between cells. Task 42 assigns channel sets in the south-north hemisphere, and task 44 assigns channel sets in the north-south hemisphere.

By performing tasks 42 and 44 in the first embodiment, discussed above, channel sets are assigned to all active cells 28. In this second embodiment, tasks 42 and 44 refrain from assigning channel sets to footprints 30 (FIG. 2) produced by satellites 12 residing in an orbital plane 14 adjacent seam 16 (FIG. 1). Each of tasks 42 and 44 utilize an Assign Channel Sets procedure 48', a flow chart of which is shown in FIG. 16.

Figure 16:
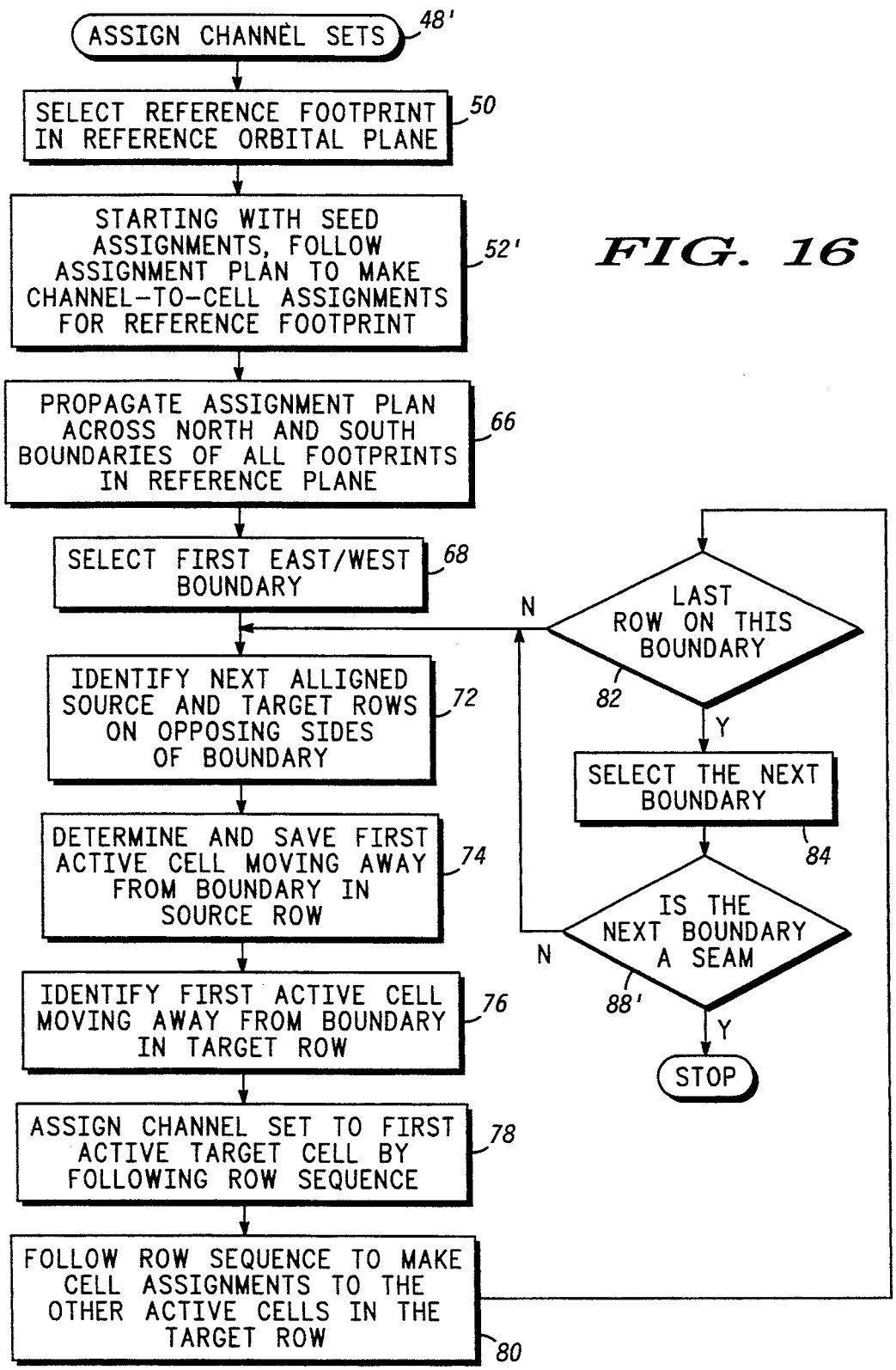
FIG. 16 shows a flow chart of an alternate Assign Channel Sets procedure which is used by the procedure depicted in FIG. 15 in accordance with the present invention.

With reference to FIG. 16, procedure 48' operates in a manner similar to that described for procedure 48 (FIG. 5). As in procedure 48, task 50 selects a reference footprint 30a (FIG. 6) in a reference orbital plane 14a. Preferably, this selected footprint 30a is one that has been simulated as being equatorially located and adjacent seam 16.

Procedure 48' next performs task 52'. Task 52' follows a channel set assignment plan to assign channel sets to the cells 28 located within reference footprint 30a. In this second embodiment, the channel set assignment plan, discussed above in connection with FIG. 5, uses a recorded seed assignment of a channel set to a cell in the reference footprint 30a as a basis for the assignments made to cells 28 in the footprint 30a. As is discussed below, this seed assignment has been recorded from the momentary channel-to-cell assignment definition previously generated for the previous instant identified by task 126 (FIG. 15). Thus, initial channel set assignments made by task 52' are based upon channel set assignments made in the previous iteration for the previous instant. This allows the same channels sets to be assigned to the same cells in this momentary channel-to-cell assignment definition as were assigned in the previously generated momentary channel-to-cell assignment definition, to the maximum extent possible given that the cells are now simulated to reside at new positions.

After task 52', procedure 48' performs tasks 66, 68, 72, 74, 76, 78, 80, 82, and 84 in the same manner as discussed above in connection with FIG. 5. Generally speaking, channel set to cell assignments are propagated north and south until all footprints 30 in the reference orbital plane have been assigned, and channel sets are propagated from footprints 30 adjacent seam 16 toward the portion of seam 16 that is located a hemisphere away.

Query task 88' determines whether to repeat the assignment process for another orbital plane 14 of footprints 30. Prior to query task 88', task 84 selected a boundary 86 (FIG. 10) between the previously assigned plane of footprints 30 and a plane of footprints 30 for which channel sets have not yet been assigned. In this second embodiment of the present invention, task 88' determines whether the next boundary to the just selected boundary 86 is seam 16. So long as this next boundary is not seam 16, program control is allowed to loop back to task 72 to allow procedure 48' to make channel set to cell assignments up to boundary 86, selected in task 84. When this next boundary to the just selected boundary 86 is seam 16, program control exits procedure 48'. In the first embodiment of the present invention, discussed above in connection with FIG. 5, task 88 permitted channel set to cell assignments to take place up to seam 16. In this second embodiment, task 88' stops channel set to cell assignments before the plane of footprints 30 adjacent seam 16 has been assigned.

Accordingly, after performing procedure 48' in accordance with tasks 42 and 44 (FIG. 15), channel set to cell assignments have been made on one side of seam 16 surrounding the earth. However, no channel sets have been assigned to cells 28 residing in footprints 30 that are adjacent the opposing side of seam 16.

With reference back to FIG. 15, after tasks 42 and 44, procedure 34' performs task 128 to assign channel sets to the unassigned cells 28 near seam 16 (FIG. 1). Task 128 uses an Assign Seam Channel Sets procedure 130, a flow chart of which is shown in FIG. 17.

Figure 17:
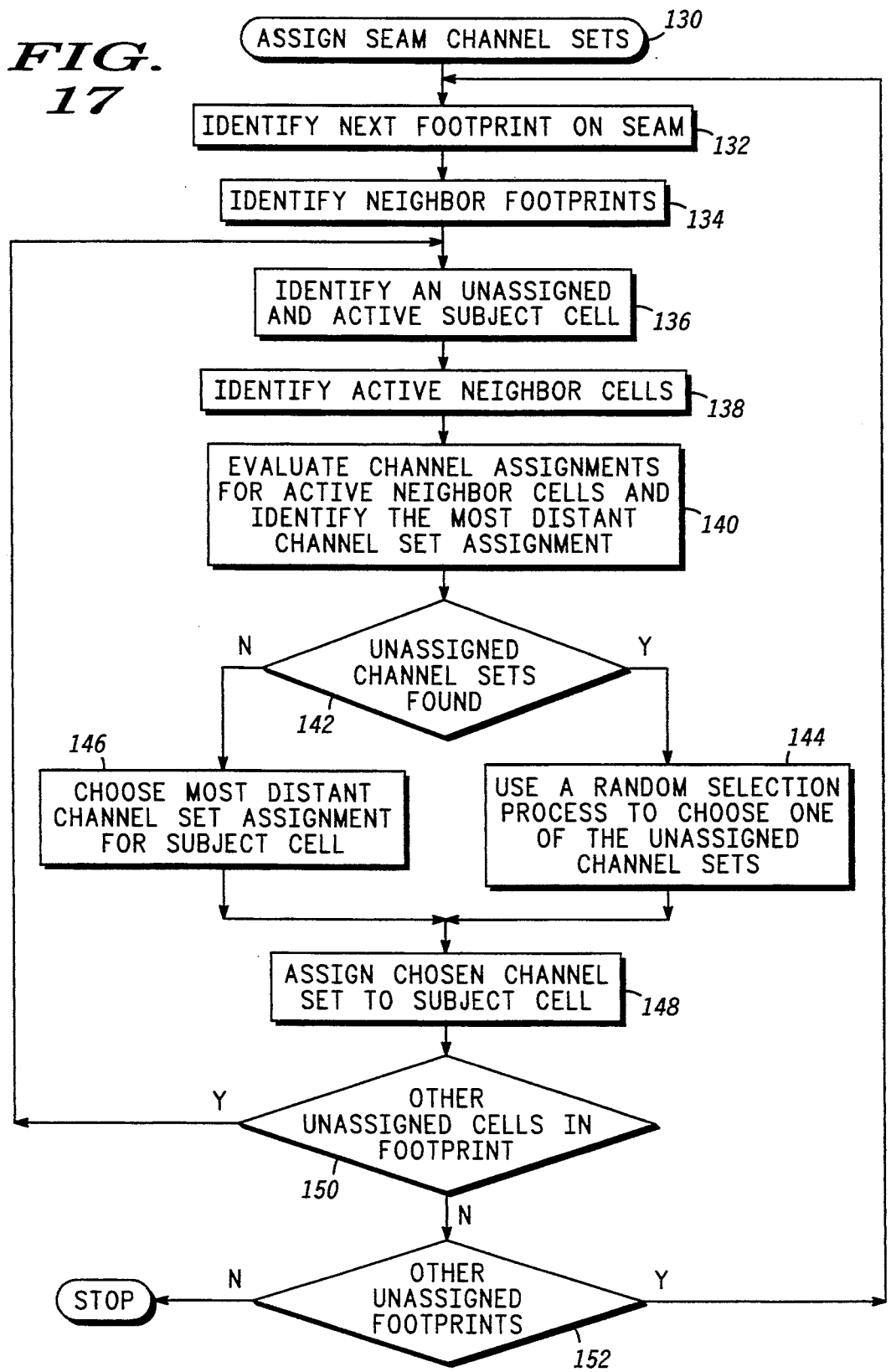
FIG. 17 shows a flow chart of an Assign Seam Channel Sets procedure which is used by the procedure depicted in FIG. 15 in accordance with the present invention.

Referring to FIG. 17, procedure 130 is generally organized to provide an inner loop and an outer loop. Through the outer loop, procedure 130 assigns channel sets to the unassigned footprints 30 adjacent seam 16 (FIG. 1). Through the inner loop, procedure 130 assigns channel sets to the unassigned cells within each unassigned footprint 30.

Procedure 130 performs task 132 to identify a next footprint 30 adjacent seam 16 (FIG. 1) which has not yet had channels sets assigned thereto. The particular footprint 30 chosen when more than one unassigned footprint 30 is available for selection is unimportant. After a footprint 30 has been selected in task 132, task 134 identifies neighbor footprints to the selected footprint. The neighbor footprints are ones which reside within a predetermined spherical distance of the selected footprint. This selected distance is desirably slightly greater than the diameter of the selected footprint 30. Thus, when the selected footprint 30 is simulated to reside near the equator, six or seven neighbor footprints are identified in task 134 for the currently preferred orbital geometries. However, due to the convergence of orbits 14 (FIG. 1), when the selected footprint 30 is simulated to reside near the poles, up to nineteen neighbor footprints are identified in task 134.

After task 134, task 136 identifies a subject cell from the selected footprint's cells which has not yet been assigned a channel set. Preferably, only cells 28 marked as being active in accordance with task 40 (FIG. 15) are selected in task 136 so that processing time is not wasted assigning channel sets to inactive cells. No preference needs to be given to any particular cell 28 when more than one unassigned and active cell 28 is currently indicated for the selected footprint 30.

Next, procedure 130 performs task 138 to identify active neighbor cells to the subject cell selected above in task 136. Desirably, only active cells, as indicated through the performance of task 40 (FIG. 15) are identified in task 138 to conserve processing time. The field of search for identifying neighbor cells may be restricted to the footprint selected in task 132 and the neighbor footprints identified in task 134.

After task 138, task 140 evaluates channel set assignments, if any, for the active neighbor cells identified above in task 138. The evaluation of task 140 looks for at least two features while examining assignments made to the neighbor cells. First, the evaluation of task 140 determines the identities of channel sets, if any, which have not been assigned in the neighbor cells. Second, the evaluation of task 140 determines the most distant channel set assignment. In other words, task 140 identifies the channel set whose closest assigned cells to the subject cell are the greatest distance away from the subject cell.

After task 140, query task 142 determines whether the evaluation of task 140 found unassigned channel sets. If unassigned channel sets were found in task 140, task 144 uses a substantially random selection process to choose one of these unassigned channel sets for assignment to the subject cell. Any of the unassigned channel sets may be used in the subject cell without causing interference with channel sets already assigned. The precise random selection process used by task 144 is not a critical feature of the present invention, and random number generators commonly implemented in computer programs may be employed in randomly selecting one of the unassigned channel sets. Of course, if only one unassigned channel set is discovered during task 140, that one channel set is chosen for assignment to the subject cell.

If an unassigned channel set is not discovered during the evaluation of task 140, query task 142 routes program control to task 146. Task 146 chooses the most distant channel set assigned to the neighbor cells for assignment to the subject cell. By choosing the most distant channel set assignment, potential interference is minimized.

After tasks 144 or 146, task 148 assigns the chosen channel set to the subject cell. As discussed above in connection with FIG. 5, this assignment may be accomplished by writing appropriate entries into position table 38 (FIG. 4).

Next, query task 150 determines whether other cells 28 in the selected footprint 30 have not yet been assigned channel sets. Task 150 may desirably confine its inquiry to only active cells to conserve processing time. If unassigned active cells remain in the selected footprint, program control loops back to task 136, forming the above-discussed inner loop. Program control loops through tasks 136, 138, 140, 142, 144 or 146, 148, and 150 until all active cells 28 in the selected footprint 30 have been assigned channel sets.

When task 150 determines that all active cells 28 in the selected footprint have been assigned channel sets, query task 152 determines whether other unassigned footprints 30 remain. When footprints 30 without assigned channel sets exist in position table 38 (FIG. 4), program control loops back to task 132, forming the above-discussed outer loop. Program control will remain within this outer loop to assign channel sets to all active cells 28 in all previously unassigned footprints 30. When no unassigned footprints 30 remain, program control exits the outer loop and procedure 130 from task 152.

With reference back to FIG. 15, after task 128 and procedure 130 (FIG. 17) assign channel sets near seam 16, procedure 34' performs task 154. Task 154 identifies one or more particular cells 28 of particular footprints 30 whose channel assignments will be used for the seed assignment discussed above in connection with task 52' (FIG. 16). These seed cells 28 may, for example, be the cells 28 that are simulated to reside closest to a predetermined near-equator latitude in a footprint 30 adjacent seam 16. Once these seed cells 28 have been identified, task 154 records the channel set assignments made thereto for use in a subsequent momentary channel-to-cell assignment definition. In the subsequent assignment definition, all channel set assignments will be responsive to these seed assignments to reduce channel set assignment changes from assignment definition to assignment definition.

At this point, a momentary channel-to-cell assignment definition has been generated for the next instant identified above in task 126. Next, query task 46 determines whether an entire orbit's positions for satellites 12 have been simulated, as discussed above in connection with FIG. 3. So long as an entire orbit has not yet been simulated, program control loops back to task 126 to generate a momentary channel-to-cell assignment definition for a succeeding instant. As shown in FIG. 4, each of the momentary channel-to-cell assignment definitions may be stored in a corresponding segment 156 of position table 38.

Those skilled in the art will appreciate that any number of future instants may be simulated in one setting, and that the entire orbit for which task 46 tests is chosen somewhat arbitrarily. When task 46 determines that the desired number of momentary channel-to-cell assignment definitions have been generated, whether for an entire orbit or otherwise, program control proceeds to task 158.

Task 158 evaluates the momentary channel-to-cell assignment definitions stored in position table 38 (FIG. 4) to detect changes in channel set assignments from assignment definition to assignment definition. As shown in query task 160, when a channel set assignment change at a particular cell 28 of a particular footprint 30 is detected, task 162 saves the identity of the cell 28, including its related footprint 30 and/or satellite 12, the instant at which the change is indicated as taking place, and the new channel set assigned to the cell 28 at the indicated instant. This data may be saved in a satellite channel-to-cell assignment plan table 164, a block diagram of which is shown in FIG. 18.

Figure 18:
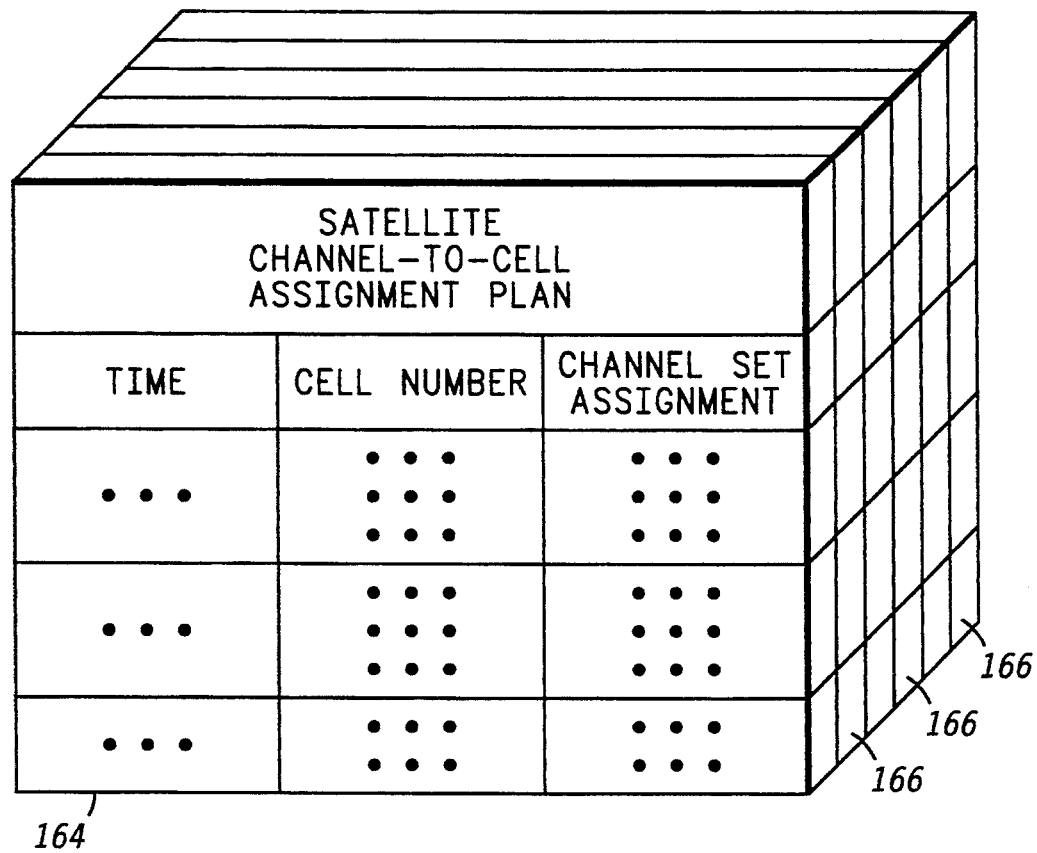
FIG. 18 shows a block diagram of a Transceiver Channel-To-Cell Assignment Plan table used by the procedure depicted in FIG. 15 in accordance with the present invention.

As shown in FIG. 18, table 164 may include a segment 166 for data which relates to each of satellites 12. Referring back to FIG. 15, after task 162 or when task 160 determines that task 158 has not detected a channel assignment change, query task 168 determines whether the evaluation of the momentary channel-to-cell assignment definition is complete. If not complete, program control loops back to task 158 and remains in a loop consisting of tasks 158, 160, and 162 until all momentary channel-to-cell assignment definitions have been evaluated.

Upon completion of the evaluation, task 170 communicates the channel-to-cell assignment plans from table 164 (FIG. 18) to their respective satellites 12. This communication may take place through the constellation of satellites The communication takes place prior to the actual occurrence of the instants identified above in task 126. As discussed above, each satellite 12 desirably saves its channel-to-cell assignment plan in its cell assignment table 106 (FIG. 12). The time data included in the assignment plan may desirably be used to program the satellite's timer 102 (FIG. 12) so that timer interrupt procedure 116 (FIG. 14) will implement the changes at the indicated instants.

In summary, the present invention provides an improved communication system. The present invention relates to a cellular communication system that efficiently reuses spectrum throughout a spherical surface, such as the surface of the earth. The spectrum is efficiently used because channel set to cell assignments are made in a manner which recognizes overlap between footprints, marks certain overlapped cells as being inactive, and assigns channel sets to active cells in a manner which is responsive to the inactive cells. Furthermore, in accordance with the present invention the marking of certain overlapped cells as being inactive and the assignment of channel sets to active cells are repeated from time to time to compensate for dynamic variance occurring in the overlap. Moreover, the same channel sets may be used through the coverage area, even in the vicinity of a seam between satellites which orbit the earth in opposing directions. The present communication system reduces communications required to dynamically assign discrete portions of spectrum to cells by minimizing channel set to cell assignment changes and by communicating only the assignment changes to the satellites.

The present invention has been described above with reference to preferred embodiments. However, those skilled in the art will recognize that changes and modifications may be made in these preferred embodiments without departing from the scope of the present invention. For example, others may devise alternate procedures to accomplish substantially the same functions as those described herein. Memory structures other than those depicted herein may by employed. Moreover, while the preferred embodiments described herein relate to a particular orbital geometry, footprint geometry, and channel set size, those skilled in the art will appreciate that the present invention may be applied to different geometries and channel set sizes. These and other changes and modifications which are obvious to those skilled in the art are intended to be included within the scope of the present invention.

What is claimed is:

1. A method of operating M antennas traveling around the earth substantially in N different orbits, where M and N are integer numbers, wherein each of said antennas projects a footprint earthward which is divided into a plurality of cells and each of said antennas is controlled by a transceiver corresponding thereto, said method comprising steps of:
generating definitions comprising a multiplicity of momentary channel-to-cell assignment definitions, each of said definitions associating channels with said cells in accordance with a spectrum assignment plan that spaces co-channel cells at least a predetermined distance apart, said multiplicity of momentary channel-to-cell assignment definitions characterizing cell locations at a multiplicity of points in time succeeding one another;
evaluating said multiplicity of definitions to determine ones of said cells and corresponding points in time for which channel assignments change and to determine new channel assignments; and
controlling said transceivers to operate in accordance with said evaluating step.

2. A method as claimed in claim 1, wherein said generating step comprises steps of:
identifying one of said multiplicity of points in time;
producing a momentary channel-to-cell assignment definition for said identified one of said points in time;
recording identities of at least one of said cells and at least one of said channels assigned thereto for said momentary channel-to-cell assignment definition produced during said producing step; and
repeating said identifying, producing, and recording steps so that subsequent repetitions of said producing step are responsive to a previous repetition of said recording step to reduce channel assignment changes in said momentary channel-to-cell assignment definitions for said points in time.

3. A method as claimed in claim 1, wherein said generating and evaluating steps occur prior to actual occurrence of any of said multiplicity of points in time, and said method additionally comprises, prior to said generating step, a step of simulating locations for said cells at said multiplicity of points in time.

4. A method as claimed in claim 3, wherein:
said simulating step is performed at a control station;
said evaluating step generates a channel-to-cell assignment plan for each of said transceivers; and
said method additionally comprises a step of communicating said channel-to-cell assignment plans from said control station to respective transceivers prior to actual occurrence of said multiplicity of points in time.

5. A method of operating antennas as claimed in claim 1, wherein a seam exists between two of said N orbits, wherein antennas adjacent to and on opposing sides of said seam travel in opposing directions, and wherein said generating step comprises steps of:
(a) making channel-to-cell assignments for cells in footprints whose locations are either immediately adjacent a first side of said seam or are not immediately adjacent said seam; and
(b) making channel-to-cell assignments for cells in footprints whose locations are immediately adjacent a second side of said seam, said step (b) being responsive to said channel-to-cell assignments made during said step (a).

6. A method as claimed in claim 5, wherein said step (b) comprises steps of:
identifying a subject cell in one of said footprints which is immediately adjacent said second side of said seam;
identifying neighbor cells which are less than a predetermined distance away from said subject cell;
evaluating channel assignments previously made to said neighbor cells; and
assigning a channel to said subject cell, wherein said channel is not currently assigned in any of said neighbor cells.

7. A method as claimed in claim 6, wherein said assigning step comprises steps of:
determining whether to select said channel from a set of channels which are not assigned to any of said neighbor cells; and
employing a substantially random selection process to select said channel from said set of channels when said channel is assigned in said assigning step.

8. A method as claimed in claim 5, wherein said step (b) comprises steps of:
identifying new subject cells in one of said footprints which is immediately adjacent said second side of said seam, said new subject cells being cells for which no channel assignment is currently in effect;
identifying neighbor cells which are less than a predetermined distance away from said new subject cell;
evaluating channel assignments previously made to said neighbor cells; and
assigning a channel to said new subject cell, wherein said channel is not currently assigned in any of said neighbor cells.

9. A method as claimed in claim 5, wherein said step (b) comprises steps of:
identifying a subject cell in one of said footprints which is immediately adjacent said second side of said seam;
identifying neighbor cells which are less than a predetermined distance away from said subject cell;
evaluating channel assignments previously made to said neighbor cells and distances between said subject cell and said neighbor cells;
determining whether no channels of said spectrum are unassigned in said neighbor cells; and
when no channels of said spectrum are unassigned in said neighbor cells, duplicating a channel assignment associated with a most distant one of said neighbor cells to provide a channel assignment for said subject cell.

10. A method of reusing spectrum at a plurality of antennas which move with respect to a surface, said method comprising steps of:
(a) simulating locations at a point in time for a plurality of footprints projected toward said surface from said plurality of antennas, wherein each of said antennas' corresponding footprints is divided into a plurality of cells;
(b) generating a momentary channel-to-cell assignment definition by associating channels of said spectrum with at least a portion of said cells simulated in said step (a), said channels being associated in accordance with a spectrum assignment plan that spaces co-channel cells a predetermined distance apart;

(c) repeating said steps (a) and (b) for a plurality of succeeding points in time to simulate movement of said antennas and to generate a plurality of momentary channel-to-cell assignment definitions; and (d) communicating through said antennas in accordance with said plurality of momentary channel-to-cell assignment definitions.

11. A method as claimed in claim 10, wherein:

each of said antennas couples to a transceiver corresponding thereto so that each transceiver controls communications within particular ones of said cells; and said method additionally comprises steps of:

evaluating said plurality of momentary channel-to-cell assignment definitions to determine ones of said plurality of succeeding points in time at which channels assigned to cells change; and recording channel assignment changes determined in said evaluating step.

12. A method as claimed in claim 11, wherein said communicating step comprises steps of:

identifying, for each transceiver, those cells for which communications are controlled by said transceiver and for which said evaluating step has determined channel assignment changes, along with said ones of said plurality of succeeding points in time for said assignment changes and new channel assignments for said assignment changes; and controlling said transceivers in accordance with said identifying step.

13. A method as claimed in claim 10, wherein:

M of said antennas travel around the earth substantially in N different orbits, where M and N are integer numbers; and said step (a) comprises a step of identifying a seam between two of said N orbits at which nearby antennas adjacent and on opposing sides of said seam travel in opposing directions.

14. A method as claimed in claim 13, wherein said step (b) comprises steps of:

(e) generating channel-to-cell assignments for footprints whose locations are simulated by said step (a) to be either immediately adjacent a first side of said seam or not immediately adjacent said seam; and (f) generating channel-to-cell assignments for footprints whose locations are simulated by said step (a) to be immediately adjacent a second side of said seam, said step (f) being responsive to said channel-to-cell assignments generated during said step (e).

15. A method as claimed in claim 14, wherein said step (f) comprises steps of:

identifying a subject cell in one of said footprints which is immediately adjacent said second side of said seam;

identifying neighbor cells simulated by said step (a) to be less than a predetermined distance away from said subject cell;

evaluating channel assignments currently in use with said neighbor cells; and assigning a channel which is not currently assigned to any of said neighbor cells to said subject cell.

16. A method as claimed in claim 15, wherein said assigning step comprises steps of:

determining whether to select said channel from a set of channels which are not assigned to any of said neighbor cells; and when said assigning step assigns said channel, employing a substantially random selection process to select said channel from said set of channels.

17. A method as claimed in claim 14, wherein said step (f) comprises steps of:

identifying new subject cells in one of said footprints which is immediately adjacent said second side of said seam, said new subject cells being cells for which no channel assignment is currently in effect;

identifying neighbor cells which are less than a predetermined distance away from said new subject cell;

evaluating channel assignments previously made to said neighbor cells; and assigning a channel to said new subject cell, wherein said channel is not currently assigned in any of said neighbor cells.

18. A method as claimed in claim 14, wherein said step (f) comprises steps of:

identifying a subject cell in one of said footprints which is immediately adjacent said second side of said seam;

identifying neighbor cells simulated by said step (a) to be less than a predetermined distance away from said subject cell;

evaluating channel assignments previously made to said neighbor cells and distances between said subject cell and said neighbor cells;

determining whether no channels of said spectrum are unassigned in said neighbor cells; and when no channels of said spectrum are unassigned in said neighbor cells, duplicating a channel assignment associated with a most distant one of said neighbor cells for said subject cell.

19. A method as claimed in claim 10, wherein said step (a) comprises steps of:

identifying overlapping cells having common areas; and assigning active and inactive characterizations to said overlapping cells so that no two active cells occupy substantial common areas.

20. A method as claimed in claim 10, wherein said step (b) comprises steps of:

recording identities of at least one of said cells and at least one of said channels assigned thereto; and selecting channels for association with cells in a subsequent iteration of step (b) in response to said recording step from a previous iteration of said step (b) to reduce changes in said plurality of momentary channel-to-cell assignment definitions for said plurality of succeeding points in time.

21. A method as claimed in claim 10, additionally comprising a step of choosing said plurality of succeeding points in time so that a plurality of momentary channel-to-cell assignment definitions are generated to describe cell movement over a distance equivalent to a cell diameter.

22. A system for cellular communication which reuses spectrum, said spectrum comprising channels, throughout an area covered by the system and which occasionally changes allocations of said channels to cells, said system comprising:

M satellites traveling around the earth substantially in N different orbits, where M an N are integer numbers, wherein each of said M satellites includes one or more antennas that project a footprint earthward, which footprint is divided into a plurality of said cells; and a control station in data communication with each of said M satellites and configured to:

generate a multiplicity of definitions of momentary channel-to-cell assignment, each of said multiplicity of definitions associating channels with said cells in accordance with a spectrum assignment plan that spaces co-channel cells a predetermined distance apart, said multiplicity of definitions characterizing cell locations at a multiplicity of succeeding points in time, evaluate said multiplicity of definitions to determine ones of said cells and corresponding points in time at which channel assignments change and to determine new channel assignments associated therewith, and communicate identities for said ones of said cells, said corresponding points in time, and said new channel assignments to said M satellites.

23. A system as claimed in claim 22, wherein each of said M satellites additionally includes:

a radio coupled to said one or more antennas; and a memory coupled to said radio and configured to store a set of channel-to-cell assignments communicated to said each of said M satellites from said control station.

24. A method of operating antennas which are traveling orbitally, each of said antennas centripetally projecting a footprint comprising cells, each of said antennas controlled by a transceiver corresponding thereto, said method comprising steps of:

generating a multiplicity of definitions assigning momentary channel-to-cell correspondences, each of said definitions associating channels with said cells in accordance with a spectrum assignment plan that spaces co-channel cells at least a predetermined distance apart, said definitions characterizing cell locations at a multiplicity of succeeding points in time;

evaluating said definitions to determine ones of said cells and corresponding points in time for which channel assignments change and to determine new channel-to-cell assignments; and controlling said transceivers to operate in accordance with said evaluating step.

* * * * *